(12) United States Patent
Jackam et al.

(10) Patent No.: US 7,806,945 B2
(45) Date of Patent: Oct. 5, 2010

(54) PRODUCTION OF BIODIESEL AND GLYCERIN FROM HIGH FREE FATTY ACID FEEDSTOCKS

(75) Inventors: John P Jackam, Butte, MT (US); Joel M Pierce, Butte, MT (US); Frank S Fahrenbruck, Butte, MT (US)

(73) Assignee: Seneca Landlord, LLC, Ames, IA (US)

( * ) Notice: Subject to any disclaimer, the term of this patent is extended or adjusted under 35 U.S.C. 154(b) by 1448 days.

(21) Appl. No.: 10/766,740

(22) Filed: Jan. 26, 2004

(65) Prior Publication Data
US 2007/0277429 A1     Dec. 6, 2007

Related U.S. Application Data

(60) Provisional application No. 60/443,049, filed on Jan. 27, 2003, provisional application No. 60/537,251, filed on Jan. 15, 2004.

(51) Int. Cl.
*C10L 1/18* (2006.01)
(52) U.S. Cl. .................. 44/308; 44/307; 554/156; 554/157; 554/167; 554/175
(58) Field of Classification Search .............. 554/156, 554/157, 167, 175; 44/307, 308, 388
See application file for complete search history.

(56) References Cited

U.S. PATENT DOCUMENTS

| | | | |
|---|---|---|---|
| 1,659,790 A | 2/1928 | Starrels | |
| 2,290,609 A | 7/1942 | Goss et al. | |
| 2,383,580 A * | 8/1945 | Arrowsmith et al. | 554/167 |
| 2,383,581 A * | 8/1945 | Arrowsmith et al. | 554/168 |
| 2,383,601 A | 8/1945 | Kelm | |
| 2,385,599 A | 8/1945 | Glossop | |
| 2,383,596 A | 8/1948 | Dreger | |
| 2,494,366 A | 1/1950 | Sprules et al. | |
| 2,543,421 A * | 2/1951 | Price et al. | 554/167 |
| 2,588,435 A * | 3/1952 | Christiaan et al. | 554/167 |
| 2,808,421 A | 10/1957 | Brokaw | |

(Continued)

FOREIGN PATENT DOCUMENTS

DE    197 24 018 A    12/1998

(Continued)

OTHER PUBLICATIONS

Yuan, W. et al. (2005). Fuel, 84, 943-950.*

(Continued)

*Primary Examiner*—Robert J Hill, Jr.
*Assistant Examiner*—Brian McCaig
(74) *Attorney, Agent, or Firm*—Glenn Johnson; Ryan N. Carter

(57) ABSTRACT

A system and method for converting a high free fatty acid grease feedstock to biodiesel. The process comprises a glycerolysis reaction to convert free fatty acids to glycerides and a base catalyzed transesterification reaction to produce fatty acid methyl esters and glycerin in the absence of solvents. In preferred embodiments, both glycerin and methanol are recycled. The process can process a feedstock containing up to 100 percent free fatty acid content to produce biodiesel and glycerin with minimal waste generation.

18 Claims, 2 Drawing Sheets

U.S. PATENT DOCUMENTS

| | | | |
|---|---|---|---|
| 2,875,221 | A | 2/1959 | Birnbaum |
| 3,102,129 | A | 8/1963 | Birnbaum et al. |
| 3,459,736 | A | 8/1969 | Dalibor |
| 4,164,506 | A | 8/1979 | Kawahara et al. |
| 4,267,393 | A | 5/1981 | Torck et al. |
| 4,303,590 | A | 12/1981 | Tanaka et al. |
| 4,364,743 | A | 12/1982 | Erner |
| 4,371,470 | A | 2/1983 | Matsukura et al. |
| 4,668,439 | A | 5/1987 | Billenstein et al. |
| 4,695,411 | A | 9/1987 | Stern et al. |
| 4,698,186 | A | 10/1987 | Jeromin et al. |
| 4,839,287 | A | 6/1989 | Holmberg et al. |
| 4,956,286 | A | 9/1990 | Macrae |
| 5,354,878 | A | 10/1994 | Connemann et al. |
| 5,399,731 | A | 3/1995 | Wimmer |
| 5,424,467 | A | 6/1995 | Bam et al. |
| 5,434,279 | A | 7/1995 | Wimmer |
| 5,514,820 | A | 5/1996 | Assmann et al. |
| 5,525,126 | A | 6/1996 | Basu et al. |
| 5,578,090 | A | 11/1996 | Bradin |
| 5,697,986 | A | 12/1997 | Haas |
| 5,713,965 | A | 2/1998 | Foglia et al. |
| 5,847,239 | A | 12/1998 | Davey et al. |
| 5,908,946 | A | 6/1999 | Stern et al. |
| 6,013,817 | A | 1/2000 | Stern et al. |
| 6,015,440 | A | 1/2000 | Noureddini |
| 6,075,158 | A | 6/2000 | Hill |
| 6,090,959 | A | 7/2000 | Hirano et al. |
| 6,127,561 | A | 10/2000 | Jeromin et al. |
| 6,174,501 | B1 | 1/2001 | Noureddini |
| 6,211,390 | B1 | 4/2001 | Peter et al. |
| 6,262,285 | B1 | 7/2001 | McDonald |
| 6,288,251 | B1 | 9/2001 | Tsuto et al. |
| 6,398,707 | B1 | 6/2002 | Wu et al. |
| 6,399,800 | B1 | 6/2002 | Haas et al. |
| 6,440,057 | B1 | 8/2002 | Ergun et al. |
| 6,489,496 | B2 | 12/2002 | Barnhorst et al. |
| 6,500,974 | B2 | 12/2002 | Thengumpillil et al. |
| 6,642,399 | B2 | 11/2003 | Boocock |
| 6,822,105 | B1 * | 11/2004 | Luxem et al. ............... 554/167 |
| 6,965,043 | B1 * | 11/2005 | Kenneally et al. ........... 554/167 |
| 7,087,771 | B2 * | 8/2006 | Luxem et al. ............... 554/157 |
| 2002/0111504 | A1 * | 8/2002 | Peter et al. ................... 554/185 |
| 2002/0156305 | A1 | 10/2002 | Turck |
| 2003/0083514 | A1 | 5/2003 | Boocock |
| 2003/0149289 | A1 | 8/2003 | Suppes |
| 2003/0229238 | A1 | 12/2003 | Fleisher |

FOREIGN PATENT DOCUMENTS

| | | |
|---|---|---|
| EP | 0591019 B1 | 8/1997 |
| GB | 587532 A | 4/1947 |
| GB | 612667 A | 11/1948 |
| GB | 2 350 618 A | 12/2000 |
| WO | WO 95/02661 | 1/1995 |
| WO | WO9924387 * | 5/1999 |
| WO | WO02/28811 A1 | 4/2002 |
| WO | WO02/38529 A1 | 5/2002 |

OTHER PUBLICATIONS

Gouw, T.H. et al. (1964). The Journal of the American Oil Chemists' Society, 41, 142-145.*

Noureddini et al., Glycerolysis of Fats and Methyl Esters, JAOCS, 1997, pp. 419-425, vol. 74, No. 4, AOCS Press, Lincoln, Nebraska.

Tyson, Brown Grease Feedstocks for Biodiesel, WWW domain nrel.gov, 2002, pp. 1-33, National Renewable Energy Laboratory, Boulder, CO.

Tyson, Biodiesel Technology and Feedstocks, WWW domain nrel.gov, 2003, pp. 1-37, National Renewable Energy Laboratory, Boulder, CO.

Clements, Pretreatment of High Free Fatty Acid Feedstocks, Biodiesel Production Technology Workshop III, Mar. 26-28, 2003, pp. 78c-78i, Iowa State University, Lincoln, Nebraska.

Muniyappa et al; Improved Conversion of Plant Oils and Animal Fats Into Biodiesel and Co-Product; Jun. 1996; Elsevier Science Limited, 0960-8524/96 (Abstract).

Tyson, Biodiesel Research Progress 1992-1997; pp. 1-301; National Renewable Energy Laboratory; Boulder Co.; Feb. 1997.

Gerpen et al; Biodiesel Production Technology Aug. 2002-Jan. 2004; pp. 1-106; Jul. 2004; National Renewable Energy Laboratory; Boulder Co.

Lago, R. C. A., R. R. Szpiz, F. H. Jablonka, D. A. Pereira and L. Hartman; "Extraction and Transesterification of Vegetable Oils and Ethanol"; 1985; pp. 147-154; vol. 40, No. 3; Oleagineux; Paris, France.

Ma, Fangrui and Milford A. Hanna; "Biodiesel Production: a review"; 1999; pp. 1-15; vol. 70, No. 1; Bioresource Technology; Elsevier, GB.

* cited by examiner

PRODUCTION OF BIODIESEL AND GLYCERIN FROM HIGH FREE FATTY ACID FEEDSTOCKS

CROSS-REFERENCE TO RELATED APPLICATIONS

This application claims the benefit of U.S. Provisional Application Nos. 60/443,049, filed Jan. 27, 2003, and 60/537,251, filed Jan. 15, 2004, the disclosures of which applications are incorporated by reference as if fully set forth herein.

STATEMENT REGARDING FEDERALLY SPONSORED RESEARCH OR DEVELOPMENT

Not Applicable

BACKGROUND OF THE INVENTION

The present invention relates generally to a process and system for biodiesel production and more specifically to the conversion of any high free fatty acid feedstocks to fatty acid methyl esters through both esterification and transesterification reactions. The process and system economically produce biodiesel when compared to current technologies.

The background art is characterized by U.S. Pat. Nos. 1,659,790; 2,290,609; 2,383,596; 2,383,599; 2,383,601; 2,494,366; 2,808,421; 2,875,221; 3,102,129; 3,459,736; 4,164,506; 4,267,393; 4,303,590; 4,364,743; 4,371,470; 4,668,439; 4,695,411; 4,698,186; 4,839,287; 4,956,286; 5,399,731; 5,424,467; 5,434,279; 5,514,820; 5,525,126; 5,697,986; 5,713,965; 5,908,946; 6,013,817; 6,015,440; 6,090,959; 6,127,561; 6,174,501; 6,211,390; 6,262,285; 6,288,251; 6,398,707; 6,399,800; 6,440,057; 6,489,496; 6,500,974 and 6,642,399 B2; and by U.S. Patent Application Nos. 2003/00229238 and 2003/0083514 the disclosures of which patents and patent applications are incorporated by reference as if fully set forth herein.

Fatty acid methyl esters (FAMEs) produced from fats and oils are being investigated in numerous settings as replacements for petroleum-derived materials, particularly diesel fuel. There is continued and growing interest in the use of renewable resources as replacements for petroleum-derived chemicals. It has long been known that diesel engines can use the triglycerides from fats and oils as fuels. However, their use eventually results in engine failure. The problems have been examined and certain solutions have been proposed in the methods described in U.S. Pat. Nos. 6,174,501 and 6,015,440. This problem is alleviated by conversion of the fatty acids found in lipids into their simple esters, usually methyl or ethyl esters. Such a process is described in U.S. Pat. No. 6,398,707. An increasing body of evidence indicates that these esters perform well in essentially unmodified diesel engines and that they can reduce the output of particulate and hydrocarbon pollutants relative to petroleum-diesel fuel. The term "biodiesel" is applied to these esters, which are also being explored as replacements for nonrenewable chemicals in other applications, including cleaning agents, fuel additives, and substitutes for other organic solvents. Those applications have been investigated in processes described in U.S. Pat. No. 5,713,965. The invention disclosed herein can be applied to the production of FAMEs for these applications as well.

It can be appreciated that processes for biodiesel production have been in use for years. Typically, a process for biodiesel synthesis is comprised of the conversion of fatty acids with acid catalysis such as a process described in U.S. Pat. No. 4,164,506, the conversion of triglycerides with base catalysis such as the processes described in U.S. Pat. Nos. 2,383,601 and 2,494,366, or conversion of both free fatty acids and triglycerides with enzyme catalysis such as the processes described in U.S. Pat. Nos. 4,956,286, 5,697,986 and 5,713,965.

The main problem with background art processes for biodiesel production is that none of them completely addresses the production of biodiesel from low value high free fatty acid feedstocks. An economic analysis of any process for the production of biodiesel will indicate that feedstock cost is the largest portion of the production cost for biodiesel. A 15 percent free fatty acid (FFA) feedstock is the highest content that any contemporary commercial process proposes to handle; whereas, the actual feedstocks many producers will likely use (because of cost) will have up to 100 percent FFA content. Conventional acid catalyzed esterification of fatty acids is ill equipped to handle such a high FFA content.

Acid catalyzed esterification of fatty acids is not suitable for processing such high FFA concentrations. The amount of acid catalyst required to achieve high conversion rates in the esterification process increases with FFA concentration. This acid catalyst charge must be neutralized before processing the glycerides, and as the catalyst loading increases, the salt generated becomes excessive. These processes also generate a large volume of waste water as revealed by the disclosures of U.S. Pat. Nos. 4,303,590, 5,399,731 and 6,399,800. Alternatively, solid acid catalysts can be used for the fatty acid esterification reaction to avoid a neutralization step before the transesterification reaction. These processes have been extensively explored and documented, such as in U.S. Pat. No. 3,459,736 which uses titanium oxide as a catalyst, U.S. Pat. No. 4,698,186 which utilizes various solid acids as catalysts, U.S. Pat. No. 4,267,393 which uses sulfonated resins as solid acid catalysts and U.S. Pat. No. 5,908,946 which employs zinc and aluminum oxide as catalysts for the esterification reaction.

Enzymatic catalysis will readily esterify the free fatty acids, but this approach suffers reaction product inhibition from the presence of methyl esters when the fatty acids associated with mono-, di-, and tri-glycerides in the feedstock are to be esterified with enzymes. Another problem with enzymatic processing is the high cost of the catalyst. To avoid two-phase operation in packed bed and other reaction settings, some conventional processes for biodiesel production use high temperatures or volatile toxic co-solvents. Such a process has been investigated and claimed in U.S. Pat. No. 6,642,399 B2. Yet another problem with background art processes for producing biodiesel is that water is used to wash residual glycerin and salts from the FAMEs, generating a large volume of wastewater and potentially forming water and FAME emulsions as disclosed in U.S. Pat. No. 5,399,731.

Starrels in U.S. Pat. No. 1,659,790 discloses a method of producing commercial stearic acid. This invention is limited in that only an esterification step is disclosed.

Goss et al. in U.S. Pat. No. 2,290,609 discloses a process for producing fatty acid polyhydric esters. This invention is limited in that esterification must be followed by fractionation in a solvent system.

Dreger in U.S. Pat. No. 2,383,596 discloses a method for treating fatty acid glycerides. This invention is limited in that only an esterification step is disclosed.

Glossop in U.S. Pat. No. 2,383,599 discloses a method for treating fatty glycerides. This invention is limited in that free fatty acids must be separated from the fatty glycerides prior to alcoholysis.

Brokaw in U.S. Pat. No. 2,808,421 discloses a method for preparing mixed triglyceride compositions. This invention is limited in that a titanium alcoholate catalyst is required.

Birnbaum in U.S. Pat. No. 2,875,221 discloses a process for preparing monoglycerides of fatty acids. This invention is limited in that it requires admixing a substantial proportion of previously reacted monoglyceride product with a freshly mixed stream of glycerol and fat and rapidly heating the mixture on a hot surface.

Birnbaum in U.S. Pat. No. 3,102,129 discloses a process for producing monoglycerides of fatty acids. This invention is limited in that monoglycerides are produced, not methyl esters.

Erner in U.S. Pat. No. 4,364,743 discloses a synthetic liquid fuel and fuel mixtures. This invention is limited in that a process for the production and purification of alkyl esters of fatty acids is not disclosed.

Matsukura et al. in U.S. Pat. No. 4,371,470 disclose a method for manufacturing high quality fatty acid esters. This invention is limited in that a method for processing high free fatty acid feedstocks is not disclosed.

Billenstein et al. in U.S. Pat. No. 4,668,439 disclose a process for the preparation of fatty acid esters of short-chain alcohols. This invention is limited in that a process for use on high free fatty acid feedstocks is not disclosed.

Stern et al. in U.S. Pat. No. 4,695,411 disclose a process for manufacturing a fatty acid ester composition. This invention is limited in that an acid transesterification step must be followed by a basic transesterification step.

Holmberg et al. in U.S. Pat. No. 4,839,287 disclose a process for transesterification of triglycerides. This invention is limited in that the presence of a lipase enzyme is required.

Bam et al. in U.S. Pat. No. 5,424,467 disclose a method for purifying alcohol esters. This invention is limited in that the starting material must be a triglyceride. Moreover, while glycerin is recycled in the process, it is recycled downstream of the transesterification reactor.

Assmann et al. in U.S. Pat. No. 5,514,820 disclose a continuous process for the production of lower alkyl esters. This invention is limited in that the transesterification process must be carried out in at least two stages in a tube reactor. Moreover, the reference teaches that "it is particularly important to the transesterification reaction that no glycerol (reaction product) come into contact with starting oil" (col. 3, lines 4-7).

Wimmer in U.S. Pat. No. 5,434,279 discloses a process for preparing fatty acid esters of short-chain monohydric alcohols. This invention is limited in that glycerin produced by the transesterification process and previously separated off is added back to produced fatty acid ester.

Basu et al. in U.S. Pat. No. 5,525,126 disclose a process for the production of esters for use as a diesel fuel substitute. This invention is limited in that a catalyst comprising calcium acetate and barium acetate is required.

Stern et al. in U.S. Pat. No. 6,013,817 disclose a process for the production of ethyl esters. This invention is limited in that a process for the production of ethyl esters of fatty acids is disclosed. Moreover, this process uses water as an extractant for purification of the esters.

Jeromin et al. in U.S. Pat. No. 6,127,561 discloses a process for the production of monoglycerides. This invention is limited in that methyl esters are subjected to glycerolysis.

Peter et al. in U.S. Pat. No. 6,211,390 disclose a method for producing fatty acid esters. This invention is limited in that use of a near-critical extractant is required.

McDonald in U.S. Pat. No. 6,262,285 B1 discloses a process for dry synthesis and continuous separation of fatty acid methyl ester reaction product. This invention is limited in that the starting material must be a triglyceride. Moreover, the process is limited to mixing the alcohol and catalyst prior to feeding them to the transesterification operation.

Ergun et al. in U.S. Pat. No. 6,440,057 disclose a method for producing fatty acid methyl ester. This invention is limited in that crack emulsification of the contents of the transesterification reactor is required.

Thengumpillil et al. in U.S. Pat. No. 6,500,974 B2 disclose a process for preparation of a monoglyceride. This invention is limited in that the presence of a food grade polar solvent is required in the glycerolysis reactor.

Boocock in U.S. Patent Application No. 2003/0083514 A1 discloses a single-phase process for production of fatty acid methyl esters from mixtures of triglycerides and fatty acids. This invention is limited in that it requires acid catalyzed esterification of fatty acids prior to the transesterification step.

Fleisher in U.S. Patent Application No. 2003/0229238 A1 discloses a continuous transesterification process. This invention is limited in that use of a plug-flow reactor is required for the transesterification reaction.

The background art is also characterized by a number of non-patent publications. The limitations of the processes disclosed by these publications are described below.

Noureddini et al. in *Glycerolysis of Fats and Methyl Esters*, JAOCS, 1997, pp. 419-425, vol. 74, no. 4, AOCS Press, Lincoln, Nebr., discloses the glycerolysis of methyl esters and triglycerides with crude glycerin (glycerin). Glycerolysis of free fatty acids is not disclosed.

Tyson in *Brown Grease Feedstocks for Biodiesel*, WWW domain nrel.gov, 2002, pp. 1-33, National Renewable Energy Laboratory, Boulder, Colo., discloses techniques for converting greases to biodiesel. The techniques disclosed in this reference are limited in that washing of crude biodiesel with mildly acidic water is required. Moreover, the conditions taught for glycerolysis of free fatty acids (temperature in the range of 250° C. to 260° C. in the absence of a catalyst or 220° C. with a catalyst) would cause degradation of a major amount of the feedstock and loss of yield. The reference teaches that there is "no proven technology for 50+% FFA mixes" and that "combined processes for ASTM quality biodiesel not well developed, technical and economic questions exist."

Tyson in *Biodiesel Technology and Feedstocks*, WWW domain nrel.gov, 2003, pp. 1-37, National Renewable Energy Laboratory, Boulder, Colo., includes much of the same information as contained in her 2002 presentation. The reference notes that using "glycerolysis to treat FFA" to "convert FFA to monoglycerides, then transesterify" is "commercial, not currently used in biodiesel."

Davis Clements in *Pretreatment of High Free Fatty Acid Feedstocks*, Biodiesel Production Technology Workshop III, Mar. 26-28, 2003, pp. 78c-78i, Iowa State University, Lincoln, Nebr. discloses a number of methods for pretreatment of high free fatty acid feedstocks prior to transesterification. This invention is limited in that glycerolysis is carried out at 200° C. under an 11 pounds per square inch vacuum, usually with a catalyst such as zinc chloride, with venting of water. This invention is limited in that in the absence of a catalyst, a residence time of over 5 hours is required to achieve an effluent containing less than 1 percent free fatty acids.

In summary, the applicants are aware of no reports of using inexpensive feedstocks and effective technologies to produce fatty acid esters (biodiesel) economically and without environmental concerns. The current processes have the following drawbacks, which have been addressed in the process disclosed herein:

1. High temperatures and pressures,
2. Acid catalyzed esterification of fatty acids present in the starting material,
3. Use of toxic co-solvents,
4. Long processing times,
5. Low quality glycerin production, and
6. Using water to extract impurities from biodiesel.

In these respects, the conversion of high free fatty acid feedstocks to biodiesel according to the present invention substantially departs from the conventional concepts and designs of the background art, and in so doing provides a process and apparatus primarily developed for the purpose of producing fatty acid methyl esters and high quality glycerol from any low-value high free fatty acid feedstock.

BRIEF SUMMARY OF THE INVENTION

The applicants have invented a novel process for the production of fatty acid methyl esters (FAMEs) and high quality glycerin from high free fatty acid grease feedstocks. In accordance with this development, it is an object of the invention to provide a method for the preparation of biodiesel by non-catalytic glycerolysis and base catalyzed transesterification using high free fatty acid waste grease as the feedstock. Through this novel combination of process steps, these low-grade lipid materials that previously could not be utilized by existing processes are easily converted to biodiesel by means of the invention disclosed herein.

In a preferred embodiment, the process disclosed herein converts high Free Fatty Acid (FFA) feedstock into biodiesel. The disclosed process is an efficient, cost-effective method for the conversion of animal fats and recycled vegetable oils into biodiesel fuel. Moreover, the disclosed process is a low-cost method to synthesize biodiesel from animal fats and yellow greases. These feedstocks are very complex and difficult to economically process because of their high FFA levels (ranging from a few percent to 50 percent, and higher), and because they contain unprocessable material and contaminates that must be removed prior to processing, or during refinement of the products. To be economically profitable, the biodiesel industry must take advantage of lower cost feedstocks. Yield is a very important criterion as feedstock costs approach two thirds of the total cost of production of biodiesel. To gain market share in the fuels industry, biodiesel must be competitively priced with conventional hydrocarbon diesel. To accomplish this pricing objective and provide glycerin for the glycerolysis reaction, glycerin is economically produced in preferred embodiments of the disclosed process. In preferred embodiments, the process described in this disclosure has been developed to accommodate these features.

In a preferred embodiment, the invention disclosed herein combines several unit operations into an economical and unique process for the conversion of free fatty acids to glycerides and the subsequent conversion of glycerides to glycerin and FAMEs. Another object of preferred embodiments of the present invention is to provide a biodiesel and glycerin production process using high free fatty acid feedstocks that overcomes the shortcomings of the background art processes.

A preferred aspect of preferred embodiments of the disclosed process is the use of glycerin as a reactant to convert the free fatty acid in the feedstock to glycerides (mono-, di-, and tri-) through glycerolysis and then transesterifying the glycerides into fatty acid alkyl esters and glycerin with a lower alcohol with 1-5 carbons, in the preferred embodiment, methanol, through an alkali catalyzed process.

Another object of preferred embodiments of the invention is the optimization of the process, which uses no co-solvent or catalyst for rapid salt-free conversion of FFA to glycerides, and the rapid conversion of glycerides to methyl esters by caustic methoxide catalysis.

Another object of preferred embodiments of the invention is the optimization of a process for the separation and purification of the major by-product of biodiesel production, glycerin, to ensure it will be greater than 95 or 99.7 percent purity, with non-detectable levels of methanol and less than 0.5 percent weight/weight (w/w) salts.

Another object of preferred embodiments of the invention is to recover the alkali catalyst and convert it to a marketable phosphorous and potassium fertilizer or potassium sulfate fertilizer. Another object of preferred embodiments of the present invention is the use of distillation rather than water washing as a means to purify FAMEs.

Yet another object of preferred embodiments of the invention is to minimize waste streams during normal operations, use lower operating temperatures and pressures than other commercial biodiesel processes, use no toxic co-solvents and produce a high quality glycerin byproduct.

A further object of preferred embodiments of the invention is to enable production of biodiesel from low-value high free fatty acid feedstocks at a market price comparable to that of petroleum derived diesel fuels.

Another object of preferred embodiments of the invention is to provide a process wherein the impure methanol recovered from the process is purified such that water is removed. Preferably, this purification comprises adsorption onto molecular sieves that can then be dried and reused or distillation resulting in a bottoms product consisting mainly of water.

In a preferred embodiment, the invention is a process for the production of biodiesel from a lipid feedstock comprising a plurality of free fatty acids, said process comprising: introducing the lipid feedstock to a conditioning vessel; conditioning the lipid feedstock in the conditioning vessel, wherein the lipid feedstock is heated to a temperature in the range of about 55° C. to about 65° C., mixed by an agitator with a power input per unit volume of about 0.5 watts per gallon (W/gal) to about 1.5 W/gal and filtered using a rotary screen to remove solids having a dimension over about 1 micron to about 200 microns to produce a conditioned lipid feedstock; reacting the plurality of free fatty acids in the conditioned lipid feedstock with a purified glycerin product in a glycerolysis reactor, wherein the plurality of free fatty acids in the feedstock is mixed with the purified glycerin product by an agitator with a power input per unit volume of about 5.5 W/gal to about 60 W/gal and continuously reacted with the purified glycerin product in the absence of a catalyst at a temperature of about 180° C. to about 250° C. and at a pressure of about 0.1 pounds per square inch absolute to about 7 pounds per square inch absolute in a glycerolysis reaction to produce a glycerolysis reactor effluent stream that contains less than 0.5 percent by weight of free fatty acids and a plurality of glycerides, the purified glycerin product being continuously added to the glycerolysis reactor at a rate in the range of about 110 percent to about 400 percent of the stoichiometric amount of glycerin required for the glycerolysis reaction, water being continuously removed from the glycerolysis reactor as a vapor through a fractionation column that returns condensed glycerin to the glycerolysis reactor, said glycerolysis reactor comprising at least two continuous stirred tank reactors that are operated in series; said reactors having a combined residence time of not more than about 500 minutes; reacting the plurality of glycerides contained in the glycerolysis effluent stream with a purified methanol product comprising methanol in a transesterification reactor, wherein the plurality of glycerides are mixed with said purified methanol product and potassium hydroxide by an agitator with a power input per unit volume of about 3.0 W/gal to about 50 W/gal and continuously reacted with the methanol at a temperature in the range of about 25° C. to about 65° C. and at a pressure of about 1 bar in an alkali catalyzed reaction to produce a transesterification reactor effluent stream that contains a plurality of fatty acid methyl esters and glycerin, the purified methanol product being added to the transesterification reactor at a rate equal to about 200 percent of the stoichiometric amount of methanol required for the catalyzed reaction, the potassium hydroxide being added to the transesterification reactor at a rate of about 0.5 percent by weight to 2.0 percent by weight of glycerides present in the glycerolysis effluent stream, said transesterification reactor comprising at least two continuous stirred tank reactors that are operated in series, said reactors having a combined residence time of about 15 minutes to about 90 minutes; separating the plurality of fatty acid methyl esters from the glycerin in the transesterification effluent stream in continuous clarifier, wherein a first liquid phase in which the plurality of fatty acid methyl esters are concentrated and a second liquid phase in which glycerin is concentrated are continuously separated at a temperature of about 25° C. to about 65° C. to produce a fatty acid methyl ester rich stream and a glycerin rich stream; purifying the fatty acid methyl ester rich stream in a distillation column and recovering methanol from it to produce a purified biodiesel product and a wet methanol stream, wherein the distillation column is operated at a temperature in the range of about 180° C. to about 230° C. and at a pressure in the range of about 0.1 pounds per square inch absolute to about 2 pounds per square inch absolute; purifying the glycerin rich stream and recovering methanol from it to produce the purified glycerin product and a wet methanol stream, wherein the potassium hydroxide in the glycerin rich stream is reacted with a mineral acid to produce an insoluble salt having fertilizer value that is removed from the glycerin rich stream in a solids separation operation and thereafter filtered and rinsed with methanol, the pH of the glycerin rich stream being adjusted to neutral by adding an alkali solution and then further purified in a glycerin distillation column that is operated at a temperature in the range of about 180° C. to about 230° C. and at a pressure in the range of about 0.1 pounds per square inch absolute to about 2 pounds per square inch absolute and in a decolorization column comprising a packed bed of activated carbon operated at a temperature in the range of about 40° C. to about 200° C.; purifying the wet methanol stream by removing water from it to produce a purified methanol product, wherein the wet methanol stream is purified in a methanol distillation column that is operated at a temperature in the range of about 60° C. to about 110° C. and at a pressure in the range of about 14 pounds per square inch absolute to about 20 pounds per square inch absolute; recycling at least a portion of the purified glycerin product into the glycerolysis reactor for reaction with the plurality of free fatty acids; and recycling at least a portion of the purified methanol product into the transesterification reactor for reaction with the plurality of glycerides.

In another preferred embodiment, the invention is a process for the production of biodiesel from a lipid feedstock comprising a free fatty acid, said process comprising: conditioning the lipid feedstock in a conditioning reactor, wherein the lipid feedstock is heated, mixed and filtered to produce a conditioned lipid feedstock; reacting the free fatty acid in the conditioned lipid feedstock with a purified glycerin product in a glycerolysis reactor, wherein the free fatty acid in the feedstock is mixed and continuously reacted with the purified glycerin product in the absence of a catalyst at an appropriate temperature and pressure in a glycerolysis reaction to produce a glycerolysis reactor effluent stream that contains a glyceride, the purified glycerin product being continuously added to the glycerolysis reactor at a rate that is greater than the stoichiometric amount of glycerin required for the glycerolysis reaction, water being continuously removed from the glycerolysis reactor as a vapor; reacting the glyceride contained in the glycerolysis effluent stream with a purified alcohol product comprising an alcohol in a transesterification reactor, wherein the glyceride is mixed with said purified alcohol product and continuously reacted with the alcohol at an appropriate temperature and pressure in an alkali catalyzed transesterification reaction to produce a transesterification reactor effluent stream that contains a fatty acid alkyl ester and glycerin, the purified alcohol product being added to the transesterification reactor at a rate that is greater than the stoichiometric amount of alcohol required for the alkali catalyzed transesterification reaction; separating the plurality of fatty acid alkyl esters from the glycerin in the transesterification effluent stream in a continuous operation, wherein a first liquid phase in which the plurality of fatty acid methyl esters are concentrated and a second liquid phase in which glycerin is concentrated are continuously separated to produce a fatty acid methyl ester rich stream and a glycerin rich stream; purifying the fatty acid alkyl ester rich stream in a fatty acid alkyl ester distillation column or a fatty acid alkyl ester fractionation column and recovering the alcohol from it to produce a purified biodiesel product and a first wet alcohol stream; purifying the glycerin rich stream and recovering the alcohol from it to produce the purified glycerin product and a second wet alcohol stream, wherein the alkali in the glycerin rich stream is reacted with an acid to produce an insoluble salt that is removed from the glycerin rich stream and thereafter filtered and rinsed with the alcohol, the pH of the glycerin rich stream being adjusted to neutral and the glycerin rich stream being further purified in a glycerin distillation column or a glycerin fractionation column and in a decolorization column; and purifying the wet alcohol streams by removing excess water to produce a purified alcohol product, wherein the wet alcohol streams are purified in an alcohol distillation column or an alcohol fractionation column. Preferably, the process further comprises: recycling at least a portion of the purified glycerin product into the glycerolysis reactor for reaction with the free fatty acid. Preferably, the process further comprises: recycling at least a portion of the purified alcohol product into the transesterification reactor for reaction with the glyceride.

In yet another preferred embodiment, the invention is a process for the production of biodiesel from a lipid feedstock comprising a free fatty acid, said process comprising: a step for continuously conditioning the lipid feedstock to produce a conditioned lipid feedstock; a step for continuously measuring the concentration of the free fatty acid in the conditioned lipid feedstock by means of an in-line free fatty acid titration device that produces a signal; a step for continuously reacting the free fatty acid in the conditioned lipid feedstock in a glycerolysis reaction, wherein the free fatty acid in the feedstock is reacted with glycerin to produce a glyceride in response to the signal from the in-line free fatty acid titration device; a step for continuously reacting the glyceride in a transesterification reaction, wherein the glyceride is converted to a fatty acid methyl ester and glycerin via an alkali catalyzed reaction; a step for continuously separating the fatty acid methyl ester from the glycerin to produce a fatty acid methyl ester rich stream and a glycerin rich stream; a step for continuously purifying the fatty acid methyl ester rich stream and recovering the methanol from the fatty acid methyl ester rich stream to produce a purified biodiesel product and a first wet methanol stream; a step for continuously purifying the glycerin rich stream and recovering the methanol from the glycerin rich stream to produce a purified glycerin product and a second wet methanol stream; a step for continuously purifying the wet methanol streams to produce a purified methanol product; and a step for recycling at least a portion of the purified glycerin product into the glycerolysis reactor for reaction with the free fatty acid. Preferably, the process further comprises: a step for recycling at least a portion of the purified methanol product into the transesterification reactor for reaction with the glyceride.

In a further preferred embodiment, the invention is a process for the production of biodiesel from a lipid feedstock comprising a free fatty acid, said process comprising: introducing a lipid feedstock to a conditioning reactor; conditioning the lipid feedstock, wherein the lipid feedstock is heated, mixed and filtered to produce a conditioned lipid feedstock; reacting the free fatty acid in the conditioned lipid feedstock in a glycerolysis reactor, wherein the free fatty acid in the feedstock is continuously reacted with a stoichiometric excess of glycerin to produce a glyceride via a glycerolysis reaction; reacting the glyceride in a transesterification reactor, wherein the glyceride is continuously converted to a fatty acid methyl ester and glycerin via an alkali catalyzed transesterification reaction; separating the fatty acid methyl ester from the glycerin, wherein a first liquid phase in which the fatty acid methyl ester is concentrated and a second liquid phase in which glycerin is concentrated are continuously separated to produce a fatty acid methyl ester rich stream and a glycerin rich stream; purifying the fatty acid methyl ester rich stream and recovering the methanol from the fatty acid methyl ester rich stream to produce a purified biodiesel product and a first wet methanol stream; purifying the glycerin rich stream and recovering the methanol from the glycerin rich stream to produce a purified glycerin product and a second wet methanol stream; purifying the wet methanol streams by removing water from them to produce a purified methanol product; recycling at least a portion of the purified glycerin product into the glycerolysis reactor for reaction with the free fatty acid; and recycling at least a portion of the purified methanol product into the transesterification reactor for reaction with the glyceride. Preferably, the introducing the lipid feedstock step further comprises: introducing a feedstock that includes at least one free fatty acid at a concentration in the range of about 3 percent to about 97 percent by weight; moisture, impurities and unsaponafiable matter at a concentration up to about 5 percent by weight; and a remainder that includes monoglycerides, diglycerides and/or triglycerides.

In a preferred embodiment, the conditioning the lipid feedstock step produces a conditioned feedstock that is a substantially uniform mixture of liquid lipids having a temperature in the range of about 35° C. to about 250° C. More preferably, the conditioning the lipid feedstock step produces a conditioned feedstock having a temperature in the range of about 45° C. to about 65° C. Preferably, the conditioning the lipid feedstock step produces a conditioned feedstock that is a substantially free of insoluble solids.

In another preferred embodiment, the reacting the free fatty acid step further comprises: combining the free fatty acid with an effective amount of glycerin for an effective amount of time to facilitate the glycerolysis reaction under conditions wherein the free fatty acid and the glycerin come into substantially intimate contact. Preferably, a low frequency acoustic transducer is used to mix the free fatty acid and the effective amount of glycerin. Preferably, the reacting the free fatty acid step further comprises: performing the glycerolysis reaction at a temperature in the range of about 150° C. to about 250° C.; and removing water from the glycerolysis reactor. Preferably, the water is removed as vapor through a fractionation column or a distillation column that returns condensed glycerin to the glycerolysis reactor.

In a preferred embodiment, the reacting the glyceride step further comprises: contacting the glyceride with an effective amount of methanol and an effective amount of alkali catalyst under conditions wherein the glyceride, the effective amount of methanol and the effective amount of alkali catalyst come into substantially intimate contact; and wherein the effective amount of the alkali catalyst is selected from the group consisting of an effective amount of sodium hydroxide, and an effective amount of potassium hydroxide. Preferably the reacting the glyceride step further comprises: performing the transesterification reaction at a temperature in the range of about 20° C. to about 250° C. More preferably, the reacting the glyceride step further comprises: performing the transesterification reaction at a temperature in the range of about 55° C. to about 65° C. Preferably, the reacting the glyceride step further comprises: performing the transesterification reaction at an absolute pressure in the range of about 1 bar to about 250 bar. More preferably, the reacting the glyceride step further comprises: performing the transesterification reaction at an absolute pressure of about 1 bar. Preferably, a low frequency acoustic transducer is used to mix the glyceride, the effective amount of methanol and the effective amount of alkali catalyst.

In a preferred embodiment, the separating the fatty acid methyl ester from the glycerin step involves using the density difference between the first liquid phase and the second liquid phase to separate them in a continuous operation. Preferably, the purifying the fatty acid methyl ester rich stream step further comprises: using a fatty acid methyl ester distillation column or a fractionation column to separate the fatty acid methyl ester rich stream into a bottoms fraction, an overhead fraction comprising primarily methanol, and a side stream fraction comprising a fatty acid methyl ester product. Preferably the bottoms fraction produced by the fatty acid methyl ester distillation column or fractionation column comprises impurities, and unsaponafiable materials, unreacted monoglycerides, unreacted diglycerides, unreacted triglycerides and fatty acids. Preferably, the fatty acid methyl ester product produced by the fatty acid methyl ester distillation column meets ASTM specification D 6751-02. Preferably, the overhead fraction produced by the fatty acid methyl ester distillation column or fractionation column comprises essentially methanol. Preferably, the fatty acid methyl ester distillation column or fractionation column is operated at a pressure below about 2 pounds per square inch absolute. More preferably, the fatty acid methyl ester distillation column or fractionation column is operated at a pressure in the range of about 0.1 pounds per square inch absolute to about 2 pounds per square inch absolute. Preferably, the fatty acid methyl ester distillation column or fractionation column is operated at a temperature in the range of about 180° C. to about 280° C. More preferably, the fatty acid methyl ester distillation column or fractionation column is operated at a temperature in the range of about 180° C. to about 230° C. Preferably, the fatty acid methyl ester distillation column or fractionation column contains a packing material.

In a preferred embodiment, the purifying the glycerin rich stream and recovering methanol step further comprises: performing glycerin fractionation, wherein the fractions within the glycerin rich stream are separated by distillation; performing phase separation, wherein the impurities that cofractionate with glycerin are removed by immiscibility and differences in density; and glycerin polishing, wherein other impurities are removed from glycerin. Preferably, the purifying the glycerin rich stream and recovering methanol step further comprises: performing alkali catalyst precipitation, wherein the glycerin rich stream is reacted with a mineral acid suitable to form an insoluble salt with the alkali catalyst used in the transesterification reaction, wherein the mineral acid is selected from the group consisting of sulfuric acid, and phosphoric acid; performing solids separation, wherein the insoluble salt is removed from the liquid permeate; performing phase separation, wherein a fatty acid methyl ester rich liquid phase and a glycerin rich liquid phase are separated; performing pH adjustment, wherein the pH of the glycerin rich stream is adjusted by adding an alkali solution; performing glycerin fractionation, wherein the glycerin rich stream is purified by means of a glycerin distillation column and methanol is collected for further purification and reuse in the process; and performing glycerin polishing, wherein colored impurities are removed from the glycerin. Preferably the performing glycerin phase pH adjustment step is performed using ion exchange media. Preferably, the insoluble salt is separated using a rotary vacuum drum filter, a plate and frame press or a belt press. Preferably, the alkali catalyst and mineral acid used for alkali catalyst precipitation are chosen so that their reaction will produce a byproduct salt having fertilizer value; said byproduct salts are washed free of organic materials with a solvent to produce a purified salt and the purified salt is then dried and the solvent is recovered for reuse in the process. Preferably, the insoluble salt is washed free of organic impurities with a solvent prior to the performing solids separation step or during the performing solids separation step using filtration equipment. Preferably, the process further comprises drying the insoluble salt in a drier under conditions wherein temperature of the drier exceeds the boiling point of the solvent at the operating pressure of the dryer; the dryer is optionally operated under a vacuum to improve the drying; and the drier includes a condenser to recover the solvent for reuse. Preferably, the solvent is methanol. Preferably, the insoluble salt is further processed for use as a fertilizer by dissolving it in water.

In a preferred embodiment, the performing glycerin fractionation step further comprises: distilling the neutralized crude glycerin stream to produce a bottoms material, a side stream and an overhead stream. Preferably, the bottoms material contains essentially waste materials; the side stream contains essentially glycerin and trace impurities; and the overhead stream contains essentially water and methanol that is recovered and recycled. Preferably, the glycerin distillation column is operated under a reduced pressure of below about 2 pounds per square inch absolute. More preferably, the glycerin distillation column contains packing material and is operated under a reduced pressure of between about 0.1 and about 2 pounds per square inch absolute. Preferably, the glycerin distillation column is operated at an elevated temperature between about 180° C. and about 280° C. More preferably, the glycerin distillation column contains packing material and is operated at an elevated temperature between about 180° C. and about 230° C. Preferably, the glycerin polishing step comprises contacting the glycerin with activated carbon at a temperature that is between about 35° C. and 200° C. Preferably, the glycerin polishing step comprises contacting the glycerin with a packed bed of activated carbon for a contact time of less than four hours at a temperature that is between about 40° C. and 100° C. and wherein activated carbon fines carried through the packed bed are removed by filtration through a hydrophilic filter material.

In another preferred embodiment, the invention is a process for production of biodiesel and glycerin comprising: inputting to a glycerolysis reactor an effective amount of glycerin and a feedstock comprising 3 to 100 percent free fatty acids and, optionally, a fat and/or an oil; reacting in the glycerolysis reactor the glycerin and at least a portion of the feedstock in an esterification reaction, with removal of water, to continuously produce a first intermediate product comprising glycerides (including monoglycerides, diglycerides and/or triglycerides) and essentially no water; performing in a transesterification reactor continuous base-catalyzed transesterification of the intermediate product to produce a second intermediate product comprising fatty acid methyl esters and glycerin; continuously treating the second intermediate product to separate the fatty acid methyl esters from the glycerin to produce a fatty acid methyl ester rich stream and a glycerin rich stream; continuously purifying the fatty acid methyl ester rich stream and recovering methanol from it to produce a purified biodiesel product and a first wet methanol stream; continuously purifying the glycerin rich stream to produce a purified glycerin product and a second wet methanol stream; continuously purifying the wet methanol streams to produce a purified methanol product; and recycling at least a portion of the purified glycerin product into the glycerolysis reactor for reaction with the free fatty acids; and recycling at least a portion of the purified methanol product into the transesterification reactor for reaction with the glycerides. Preferably, the feedstock comprises an animal fat and/or a vegetable oil. Preferably, the effective amount of glycerin is about two times the stoichiometric amount of fatty acids in the feedstock. Preferably, the reacting step is carried out at a temperature in the range of about 200° C. to about 250° C., under agitation and to the extent that the first intermediate product contains no more than 0.5 percent w/w of free fatty acids. Preferably, the performing step comprises adding potassium methoxide to the intermediate product to facilitate base catalysis and wherein the performing step is carried out at a temperature in the range of about 40° C. to about 60° C.

In yet another preferred embodiment, the invention is a system for the production of biodiesel from a lipid feedstock comprising a plurality of free fatty acids, said system comprising: means for introducing the lipid feedstock to a conditioning reactor; means for conditioning the lipid feedstock in the conditioning reactor, said means for conditioning comprising means for heating the lipid feedstock, an acoustic transducer or an impellor system (or mixing the lipid feedstock), and means for filtering the lipid feedstock comprising a traveling screen, said means for conditioning being operative to produce a conditioned lipid feedstock; means for measuring the concentration of free fatty acids in the conditioned lipid feedstock; first means for reacting the plurality of free fatty acids in the conditioned lipid feedstock with a purified glycerin product in a glycerolysis reactor, said first means for reacting comprising first means for mixing the plurality of free fatty acids in the feedstock with the purified glycerin product, said first means for mixing comprising an acoustic transducer or an impellor system, and means for continuously reacting the plurality of fatty acids with the purified glycerin product in the absence of a catalyst in a glycerolysis reaction, means for continuously adding the purified glycerin product to the glycerolysis reactor, and means for removing water continuously from the glycerolysis reactor as a vapor, said means for removing water comprising a fractionation column that is operative to return condensed glycerin to the glycerolysis reactor, said glycerolysis reactor comprising at least two continuous stirred tank reactors that are operated in series, said at least two continuous stirred tank reactors having a combined residence time of about 200 minutes, said first means for reacting being operative to produce a glycerolysis reactor effluent stream; second means for reacting the plurality of glycerides contained in the glycerolysis effluent stream with a purified methanol product in a transesterification reactor, said second means for reacting comprising second means for mixing the plurality of glycerides with said purified methanol product and potassium hydroxide, said second means for mixing comprising an acoustic transducer or an impellor system, means for continuously reacting the glycerides with the methanol in an alkali catalyzed transesterification reaction, means for adding the purified methanol product to the transesterification reactor, means for adding the potassium hydroxide to the transesterification reactor, said transesterification reactor comprising at least two continuous stirred tank reactors that are operated in series, said reactors having a combined residence time of about 60 minutes, said second means for reacting being operative to produce a transesterification reactor effluent stream that contains a plurality of fatty acid methyl esters and glycerin; means for separating the plurality of fatty acid methyl esters from the glycerin in the transesterification effluent stream, said means for separating comprising means for concentrating a first liquid phase in which the plurality of fatty acid methyl esters are concentrated and a second liquid phase in which glycerin is concentrated, said means for concentrating comprising a continuous clarifier, said means for separating being operative to produce a fatty acid methyl ester rich stream and a glycerin rich stream; first means for purifying the fatty acid methyl ester rich stream comprising a fatty acid methyl ester distillation column and means for recovering methanol from it to produce a purified biodiesel product and a first wet methanol stream; second means for purifying the glycerin rich stream and recovering methanol from it to produce the purified glycerin product and a second wet methanol stream, said second means for purifying comprising means for reacting the potassium hydroxide in the glycerin rich stream with phosphoric acid to produce an insoluble salt having fertilizer value, a solids separation operation for removing the insoluble salt from the glycerin rich stream, means for rinsing the insoluble salt with methanol and filtering the insoluble salt, means for adjusting the pH of the glycerin rich stream to about neutral by adding an alkali solution and a glycerin distillation column for further purifying the glycerin rich stream and a decolorization column comprising a packed bed of activated carbon column; third means for purifying the wet methanol streams by removing water to produce a purified methanol product, said third means for purifying comprising a methanol distillation column wherein the wet methanol streams are purified; first means for recycling at least a portion of the purified glycerin product into the glycerolysis reactor for reaction with the plurality of free fatty acids; and second means for recycling at least a portion of the purified methanol product into the transesterification reactor for reaction with the plurality of glycerides.

In a further preferred embodiment, the invention is a system for the production of biodiesel from a lipid feedstock comprising a free fatty acid, said system comprising: means for conditioning the lipid feedstock in a conditioning reactor, said means for conditioning being operative to heat, mix and filter the lipid feedstock to produce a conditioned lipid feedstock; first means for reacting the free fatty acid in the conditioned lipid feedstock with a purified glycerin product in a glycerolysis reactor, said first means for reacting comprising first means for mixing the free fatty acid in the feedstock, and means for continuously reacting the free fatty acid with the purified glycerin product in the absence of a catalyst in a glycerolysis reaction, means for continuously adding the purified glycerin product to the glycerolysis reactor at a rate that is greater than the stoichiometric amount of glycerin required for the glycerolysis reaction, and means for continuously removing water from the glycerolysis reactor as a vapor, said first means for reacting being operative to produce a glycerolysis reactor effluent stream that contains a glyceride; second means for reacting the glyceride contained in the glycerolysis effluent stream with a purified alcohol product in a transesterification reactor, said second means for reacting comprising second means for mixing the glyceride with said purified alcohol product, means for continuously reacting the glyceride with the alcohol in an alkali catalyzed transesterification reaction, means for adding the purified alcohol product to the transesterification reactor at a rate that is greater than the stoichiometric amount of alcohol required for the alkali catalyzed transesterification reaction, said second means for reacting being operative to produce a transesterification reactor effluent stream that contains a fatty acid methyl ester and glycerin; means for separating the plurality of fatty acid methyl esters from the glycerin in the transesterification effluent stream, said means for separating comprising a continuous operation, and said means for separating being operative to produce a first liquid phase in which the plurality of fatty acid methyl esters are concentrated and a second liquid phase in which glycerin is concentrated to produce a fatty acid methyl ester rich stream and a glycerin rich stream; first means for purifying the fatty acid methyl ester rich stream comprising a fatty acid methyl ester distillation column or a fatty acid methyl ester fractionation column and first means for recovering alcohol from the fatty acid methyl ester rich stream that are operative to produce a purified biodiesel product and a first wet alcohol stream; second means for purifying the glycerin rich stream and second means for recovering alcohol from the glycerin rich stream that are operative to produce the purified glycerin product and a second wet alcohol stream, said second means for purifying comprising means for reacting the alkali in the glycerin rich stream with an acid to produce an insoluble salt, means for removing the insoluble salt from the glycerin rich stream, means for filtering the insoluble salt and rinsing the insoluble salt with the alcohol, means for adjusting the pH of the glycerin rich stream to about neutral, a glycerin distillation column or a glycerin fractionation column, and a decolorization column; and third means for purifying the wet alcohol streams by removing water that is operative to produce a purified alcohol product, said third means for purifying comprising an alcohol distillation column or an alcohol fractionation column. Preferably, the system further comprises: first means for recycling at least a portion of the purified glycerin product into the glycerolysis reactor for reaction with the free fatty acid. Preferably, the system further comprises: second means for recycling at least a portion of the purified alcohol product into the transesterification reactor for reaction with the glyceride. Preferably, the system further comprises means for delivering at least a portion of the purified biodiesel product and at least a portion of the purified glycerin product to their markets.

In another preferred embodiment, the invention is a system for the production of biodiesel from a lipid feedstock comprising a free fatty acid, said system comprising: means for continuously conditioning the lipid feedstock that is operative to produce a conditioned lipid feedstock; means for continuously measuring the concentration of the free fatty acid in the conditioned lipid feedstock; first means for continuously reacting the free fatty acid in the conditioned lipid feedstock in a glycerolysis reaction that is operative to react the free fatty acid in the feedstock with glycerin to produce a glyceride; second means for continuously reacting the glyceride in a transesterification reaction that is operative to convert the glyceride to a fatty acid methyl ester and glycerin via an alkali catalyzed reaction; means for continuously separating the fatty acid methyl ester from the glycerin that is operative to produce a fatty acid methyl ester rich stream and a glycerin rich stream; first means for continuously purifying the fatty acid methyl ester rich stream and means for recovering methanol from the fatty acid methyl ester rich stream that are operative to produce a purified biodiesel product and a first wet methanol stream; second means for continuously purifying the glycerin rich stream that is operative to produce a purified glycerin product and a second wet methanol stream; third means for continuously purifying the wet methanol streams that is operative to produce a purified methanol product; and first means for recycling at least a portion of the purified glycerin product into the first means for continuously reacting for reaction with the free fatty acid. Preferably, the system further comprises: means for recycling at least a portion of the purified methanol product into the second means for continuously reacting for reaction with the glyceride.

In yet another preferred embodiment, the invention is a system for the production of biodiesel from a lipid feedstock comprising a free fatty acid, said system comprising: means for introducing a lipid feedstock to a conditioning reactor; means for conditioning the lipid feedstock that is operative to heat, mix and filter the lipid feedstock to produce a conditioned lipid feedstock; first means for reacting the free fatty acid in the conditioned lipid feedstock comprising a glycerolysis reactor that is operative to continuously react the free fatty acid in the feedstock with glycerin to produce a glyceride via a glycerolysis reaction; second means for reacting the glyceride comprising a transesterification reactor that is operative to continuously convert the glyceride to a fatty acid methyl ester and glycerin via an alkali catalyzed transesterification reaction; means for separating the fatty acid methyl ester from the glycerin that is operative to produce a first liquid phase in which the fatty acid methyl ester is concentrated and a second liquid phase in which glycerin is concentrated that are continuously separated to produce a fatty acid methyl ester rich stream and a glycerin rich stream; first means for purifying the fatty acid methyl ester rich stream and first means for recovering methanol from the fatty acid methyl ester rich stream that are operative to produce a purified biodiesel product and a first wet methanol stream; second means for purifying the glycerin rich stream and means for recovering methanol from the glycerin rich stream that are operative to produce a purified glycerin product and a second wet methanol stream; third means for purifying the wet methanol streams by removing water from them that is operative to produce a purified methanol product; first means for recycling at least a portion of the purified glycerin product into the glycerolysis reactor for reaction with the free fatty acid; and second means for recycling at least a portion of the purified methanol product into the transesterification reactor for reaction with the glyceride.

In another preferred embodiment, the invention is a system for the production of biodiesel from a lipid feedstock comprising a free fatty acid, said system comprising: a conditioning reactor that is operative to heat, mix and filter the lipid feedstock to produce a conditioned lipid feedstock; an in-line free fatty acid titration device that is operative to quantify the concentration of the free fatty acid in the conditioned lipid feedstock; a continuous glycerolysis reactor that is operative to continuously react the free fatty acid in the conditioned lipid feedstock with glycerin to produce a glyceride via a glycerolysis reaction in response to a signal from the in-line free fatty acid titration device; a continuous transesterification reactor that is operative to continuously convert the glyceride to a fatty acid methyl ester and glycerin via an alkali catalyzed transesterification reaction in response to the signal from the in-line free fatty acid titration device; a phase separation centrifuge that is operative to produce a first liquid phase in which the fatty acid methyl ester is concentrated and a second liquid phase in which glycerin is concentrated that are continuously separated to produce a fatty acid methyl ester rich stream and a glycerin rich stream; a fatty acid methyl ester fractionation column that is operative to produce a purified biodiesel product and a first wet methanol stream; a glycerin fractionation column that is operative to produce a purified glycerin product and a second wet methanol stream; a methanol fractionation column that is operative to treat the first wet methanol stream and the second wet methanol stream to produce a purified methanol product; first pump for recycling at least a portion of the purified glycerin product into the glycerolysis reactor for reaction with the free fatty acid; and second pump for recycling at least a portion of the purified methanol product into the transesterification reactor for reaction with the glyceride.

In another preferred embodiment, the invention is a process for the production of biodiesel from a lipid feedstock comprising a plurality of free fatty acids, said process comprising: reacting the plurality of free fatty acids in the lipid feedstock with a purified glycerin product in a glycerolysis reactor, wherein the plurality of free fatty acids in the feedstock is mixed with the purified glycerin product in an agitated vessel to produce a glycerolysis reactor effluent stream that contains less than 0.5 percent by weight of free fatty acids and a plurality of glycerides, the purified glycerin product being added to the glycerolysis-reactor in the range of about 110 percent to about 400 percent of the stoichiometric amount of glycerin required for the glycerolysis reaction, and water being continuously removed from the glycerolysis reactor as a vapor through a vent in the reactor headspace; reacting the plurality of glycerides contained in the glycerolysis effluent stream with an alcohol in a transesterification reactor, wherein the plurality of glycerides are mixed with said alcohol and a catalyst to produce a transesterification reactor effluent stream that contains a plurality of fatty acid alkyl esters and glycerin, the alcohol being added to the transesterification reactor as a purified alcohol product at a rate equal to about 200 percent of the stoichiometric amount of alcohol required for the catalyzed reaction, and the catalyst being added to the transesterification reactor at a rate sufficient to catalyze the reaction; separating the plurality of fatty acid alkyl esters from the glycerin in the transesterification effluent stream by the difference in their densities, wherein the force of gravity or centrifugal force is used to separate two distinct immiscible phases, a first liquid phase in which the plurality of fatty acid alkyl esters are concentrated and a second liquid phase in which glycerin is concentrated, to produce a fatty acid alkyl ester rich stream and a glycerin rich stream; purifying the fatty acid alkyl ester rich stream by using the differences in the vapor pressures of the components of the fatty acid alkyl ester rich stream, and recovering a first alcohol stream, a high purity biodiesel product and a first high boiling point impurities stream; purifying the glycerin rich stream and recovering a second alcohol stream, the purified glycerin product and a second high boiling point impurities stream; purifying the recovered alcohol streams by removing water from them to produce the purified alcohol product; recycling at least a portion of the purified glycerin product into the glycerolysis reactor for reaction with the free fatty acids in the feedstock; and recycling at least a portion of the purified methanol product into the transesterification operation for reaction with the plurality of glycerides. Preferably, the process further comprises: prior to the step of reacting the plurality of free fatty acids, conditioning the feedstock by elevating the temperature of the feedstock to at least 35° C., mixing the feedstock and filtering out insoluble solids to generate a uniform mixture of glycerides, free fatty acids and unsaponafiable materials. Preferably, the glycerolysis reactor is a continuous reactor and the step of reacting the plurality of free fatty acids is carried out in a continuous fashion. Preferably, the step of reacting the plurality of free fatty acids is carried out in a series of at least two continuous stirred tank reactors. Preferably, the step of reacting the plurality of free fatty acids is carried out without a catalyst at a temperature between 150° C. and 250° C. and at a pressure between 0.1 pounds per square inch absolute and 7.0 pounds per square inch absolute. Preferably, the vapor vented from the glycerolysis reactor is fractionated to yield a liquid fraction having a high concentration of glycerin and a vapor fraction having a high concentration of water, the liquid fraction being recycled to the glycerolysis reactor. Preferably, the transesterification reactor is a continuous reactor and the step of reacting the plurality of glycerides is carried out in a continuous fashion. Preferably, the step of reacting the plurality of glycerides is carried out in a plug flow reactor. Preferably, the step of reacting the plurality of glycerides is carried out in a series of at least two continuous stirred tank reactors. Preferably, the step of reacting the plurality of glycerides is carried out in the presence of a caustic alkali catalyst selected from the group consisting of lithium hydroxide, sodium hydroxide and potassium hydroxide. Preferably, at least a portion of the glycerin is removed from the transesterification reactor before the step of reacting the plurality of glycerides is complete. Preferably, multiple methanol or catalyst additions are made to the transesterification reactor.

In another preferred embodiment, the invention is a process for the production of biodiesel from a feedstock comprising a glyceride, said process comprising: reacting the glyceride in the feedstock with a purified alcohol product comprising an alcohol in a transesterification reactor, wherein the glyceride is mixed with said purified alcohol product and continuously reacted with the alcohol at an appropriate temperature and pressure in an alkali catalyzed transesterification reaction to produce a transesterification reactor effluent stream that contains a fatty acid alkyl ester and glycerin, the purified alcohol product being added to the transesterification reactor at a rate that is greater than the stoichiometric amount of alcohol required for the alkali catalyzed transesterification reaction; separating the plurality of fatty acid alkyl esters from the glycerin in the transesterification effluent stream in a continuous operation, wherein a first liquid phase in which the plurality of fatty acid alkyl esters are concentrated and a second liquid phase in which glycerin is concentrated are continuously separated to produce a fatty acid alkyl ester rich stream and a glycerin rich stream; purifying the fatty acid alkyl ester rich stream in a fatty acid alkyl ester distillation column or a fatty acid alkyl ester fractionation column and recovering the alcohol from it to produce a purified biodiesel product and a first wet alcohol stream; purifying the glycerin rich stream and recovering the alcohol from it to produce the purified glycerin product and a second wet alcohol stream, wherein the alkali in the glycerin rich stream is reacted with an acid to produce an insoluble salt that is removed from the glycerin rich stream and thereafter filtered and rinsed with the alcohol, the pH of the glycerin rich stream being adjusted to neutral and the glycerin rich stream being further purified in a glycerin distillation column or a glycerin fractionation column and in a decolorization column; purifying the wet alcohol streams by removing water to produce a purified alcohol product, wherein the wet alcohol streams are purified in an alcohol distillation column or an alcohol fractionation column; and recycling at least a portion of the purified alcohol product into the transesterification reactor for reaction with the glyceride.

In another preferred embodiment, the invention is a process for the production of biodiesel from a lipid feedstock comprising a plurality of free fatty acids, said process comprising: reacting the plurality of free fatty acids in the lipid feedstock with a purified glycerin product in a glycerolysis reactor, wherein the plurality of free fatty acids in the feedstock is mixed with the purified glycerin product in an agitated vessel to produce a glycerolysis reactor effluent stream that contains less than 0.5 percent by weight of free fatty acids and a plurality of glycerides, the purified glycerin product being added to the glycerolysis reactor in the range of about 110 percent to about 400 percent of the stoichiometric amount of glycerin required for the glycerolysis reaction, and water being continuously removed from the glycerolysis reactor as a vapor through a vent in the reactor headspace; reacting the plurality of glycerides contained in the glycerolysis effluent stream with an alcohol in a transesterification reactor, wherein the plurality of glycerides are mixed with said alcohol and a catalyst to produce a transesterification reactor effluent stream that contains a plurality of fatty acid alkyl esters and glycerin, the alcohol being added to the transesterification reactor as a purified alcohol product at a rate equal to about 200 percent of the stoichiometric amount of alcohol required for the catalyzed reaction, and the catalyst being added to the transesterification reactor at a rate sufficient to catalyze the reaction; separating the plurality of fatty acid alkyl esters from the glycerin in the transesterification effluent stream by means of membrane filtration into two distinct immiscible phases, a first liquid phase in which the plurality of fatty acid alkyl esters are concentrated and a second liquid phase in which glycerin is concentrated, to produce a fatty acid alkyl ester rich stream and a glycerin rich stream; purifying the fatty acid alkyl ester rich stream by using the differences in the vapor pressures of the components of the fatty acid alkyl ester rich stream, and recovering a first alcohol stream, a high purity biodiesel product and a first high boiling point impurities stream; purifying the glycerin rich stream and recovering a second alcohol stream, the purified glycerin product and a second high boiling point impurities stream; purifying the recovered alcohol streams by removing water from them to produce the purified alcohol product; recycling at least a portion of the purified glycerin product into the glycerolysis reactor for reaction with the free fatty acids in the feedstock; and recycling at least a portion of the purified alcohol product into the transesterification operation for reaction with the plurality of glycerides.

Other objects and advantages of the present invention are involved in filtration, glycerolysis, transesterification, separations, solvent recovery, product purification and decoloration, and will become obvious to the reader. These and other aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate presently preferred embodiments of the invention. In the drawings.

Figure 1:
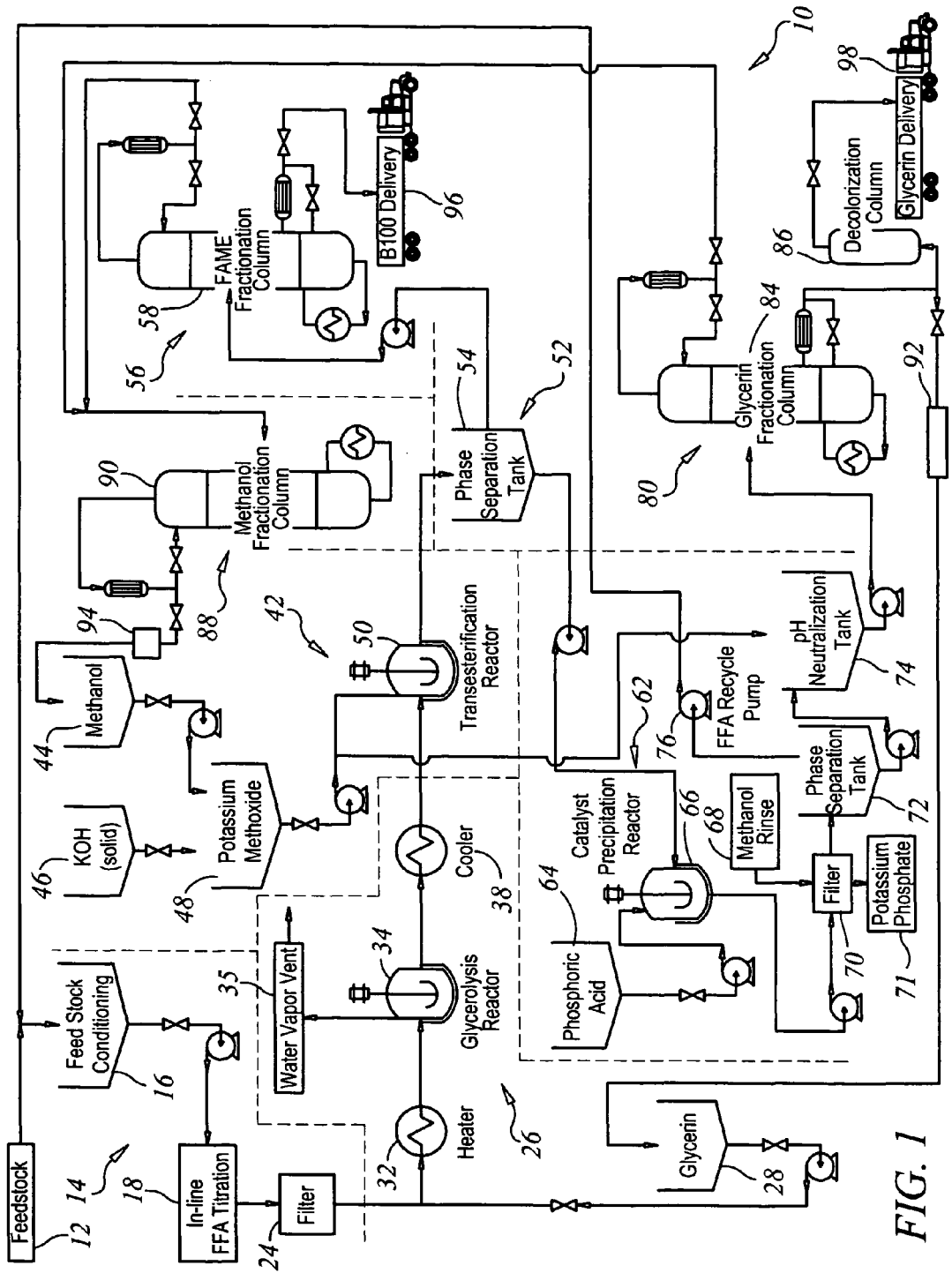
FIG. 1 is a schematic flow diagram for a preferred embodiment of the invention.

The following reference numerals are used to indicate the parts and environment of the invention on the drawings:

- 10 biodiesel production process
- 12 feedstock introduction step, introducing step
- 14 feedstock conditioning step, feedstock conditioning operation
- 16 feedstock heating and mixing step
- 18 free fatty acid quantification step
- 24 first separation step, feedstock filtration step, first separation operation
- 26 glycerolysis reaction step, glycerolysis operation
- 28 glycerin addition step
- 32 heating step
- 34 glycerolysis step
- 35 water venting step
- 38 glycerolysis effluent cooling step
- 42 alkali catalyzed transesterification step, transesterification operation
- 44 alcohol metering step
- 46 catalyst metering step
- 48 methoxide addition step
- 50 transesterification step
- 52 second separation step, second separation operation, transesterification effluent separation step
- 54 phase separation step
- 56 biodiesel purification step, fatty acid methyl esters purification step
- 58 biodiesel distillation step
- 62 catalyst separation step
- 64 phosphoric acid addition step
- 66 catalyst precipitation step
- 68 methanol washing step
- 70 catalyst precipitation reactor effluent filtration step
- 71 salt recovery step
- 72 permeate separation step
- 74 pH neutralization step
- 76 free fatty acid recycling step
- 80 glycerin purification step, glycerin refining operation
- 84 glycerin distillation or fractionalization step, glycerin separation step
- 86 glycerin decolorization step
- 88 methanol purification step
- 90 methanol distillation or fractionalization step
- 92 glycerin recycling step
- 94 methanol recycling step
- 96 biodiesel delivery step
- 98 glycerin delivery step
- 110 biodiesel production system
- 112 feedstock introduction subsystem
- 114 feedstock conditioning subsystem
- 116 feedstock heating and mixing vessel
- 118 free fatty acid titration device
- 124 filter
- 126 glycerolysis reaction subsystem
- 128 glycerin addition apparatus
- 132 input heater
- 134 first glycerolysis reactor
- 136 second glycerolysis reactor
- 138 glycerolysis effluent cooler
- 142 alkali catalyzed transesterification subsystem
- 144 methanol metering apparatus
- 146 potassium hydroxide metering apparatus
- 148 methoxide addition apparatus
- 150 first transesterification reactor
- 151 second transesterification reactor
- 152 phase separation subsystem
- 154 phase separation tank, phase separation unit, continuous clarifier
- 156 biodiesel purification subsystem
- 158 FAME fractionation column, FAME distillation column
- 162 catalyst separation subsystem
- 164 phosphoric acid addition apparatus
- 166 catalyst precipitation reactor
- 168 methanol
- 170 catalyst precipitation reactor effluent filter
- 171 potassium phosphate
- 172 permeate separation tank
- 174 pH neutralization tank
- 176 free fatty acid recycling apparatus
- 180 glycerin purification subsystem
- 184 glycerin distillation or fractionation column
- 186 glycerin decolorization column, activated carbon bed
- 190 methanol purification subsystem
- 192 glycerin recycling apparatus
- 194 methanol recycling apparatus
- 196 biodiesel delivery vehicle
- 198 glycerin delivery vehicle

DETAILED DESCRIPTION OF THE INVENTION

Referring to FIG. 1, a preferred embodiment of a process for the conversion of high free fatty acid feedstocks into biodiesel is presented. Biodiesel production process 10 preferably comprises a number of unit operations as described below.

In feedstock introduction step 12, the feedstock is introduced to process 10. The introduced feedstock is preferably conditioned in feedstock conditioning operation 14 comprising feedstock heating and mixing step 16 in which the high free fatty acid feedstock is heated and mixed to ensure a uniform, heterogeneous mixture with uniform viscosity, free fatty acid quantification step 18 in which the concentration of free fatty acids in the feedstock is measured, and first separation operation 24 in which solid (insoluble) substances are removed. In a preferred embodiment, free fatty acid measurement is performed by an automatic titration device.

Preferably, the conditioning step is carried out and produces a conditioned feedstock with a temperature in the range of about 35° C. to about 250° C. and more preferably in the range of about 45° C. to about 65° C. In a preferred embodiment, the feedstock is heated to a temperature in the range of about 55° C. to about 65° C., mixed by an agitator with a power input per unit volume of about 0.5 W/gal to about 1.5 W/gal. It is then filtered using a rotary screen to remove solids having a dimension over about 0.01 inch to produce a conditioned feedstock. In a preferred embodiment, the rotary screen is a Model No. IFO 1824, manufactured by IPEC Industries of Burnaby, BC, Canada.

The conditioned feedstock is introduced to glycerolysis reaction step 26 which preferably comprises glycerin addition step 28, heating step 32, glycerolysis step 34 in which free fatty acids are converted to glycerides and glycerolysis effluent cooling step 38. Preferably, glycerolysis reaction step 26 further comprises: performing the glycerolysis reaction at a temperature in the range of about 150° C. to about 250° C.; and removing water from the environment of the glycerolysis reaction. More preferably, glycerolysis reaction step 26 further comprises using two or more continuous stirred tank reactors in series.

In a preferred embodiment, the free fatty acids in the feedstock are mixed with a purified glycerin product using an agitator with a power input per unit volume of about 5.5 W/gal to about 60 W/gal and continuously reacted with the purified glycerin product in the absence of a catalyst at a temperature of about 220° C. and at a pressure of about 2 pounds per square inch absolute in a glycerolysis reaction to produce a glycerolysis reactor effluent stream that contains less than 0.5 percent by weight of free fatty acids and a plurality of glycerides. Preferably, the purified glycerin product is continuously added to the glycerolysis reactor at a rate in the range of about 110 percent to about 400 percent of the stoichiometric amount of glycerin required for the glycerolysis reaction and water is continuously removed from the glycerolysis reactor as a vapor through a fractionation column that returns condensed glycerin to the glycerolysis reactor. In a preferred embodiment, the esterification vacuum system draws the vapor through a heat exchanger to condense the water vapor and reduce the energy requirement for the vacuum source. Preferably, the glycerolysis reactor comprises at least two continuous stirred tank reactors that are operated in series, the reactors having a combined residence time of not greater than about 200 minutes for feedstock with a 20 percent by weight free fatty acid concentration.

The effluent from glycerolysis reaction step 26 is introduced to alkali catalyzed transesterification reaction step (operation) 42 which preferably comprises alcohol metering step 44, catalyst metering step 46, methoxide addition step 48 and transesterification step 50 in which the glycerides undergo transesterification. Preferably, transesterification reaction step further comprises: contacting the glycerides with an effective amount of methanol and an effective amount of alkali catalyst under conditions wherein the glycerides, the effective amount of methanol and the effective amount of alkali catalyst come into substantially intimate contact. Preferably, the alkali catalyst is selected from the group consisting of sodium hydroxide, and potassium hydroxide.

Preferably, transesterification reaction step 42 further comprises: performing the transesterification reaction at a temperature in the range of about 20° C. to about 250° C. and at an absolute pressure in the range of about 1 bar to about 250 bar. More preferably, transesterification reaction step 42 further comprises: performing the transesterification reaction at a temperature in the range of about 25° C. to about 65° C. and at an absolute pressure of about 1 bar. Preferably, a mixer with a power to unit volume of about 3.0 W/gal to about 50 W/gal to mix the glyceride, the effective amount of methanol and the effective amount of alkali catalyst. In a preferred embodiment, the alcohol and alkali catalyst are mixed at prescribed rates prior to their addition to the transesterification reaction operation.

In a preferred embodiment, transesterification reaction step 42 comprises: reacting the plurality of glycerides contained in the glycerolysis effluent stream with methanol in a transesterification reactor, wherein the plurality of glycerides are mixed with said methanol and potassium hydroxide by an agitator with a power to unit volume of about 3.0 W/gal to about 50 W/gal and continuously reacted with the methanol at a temperature in the range of about 25° C. to about 65° C. and at a pressure of about 1 bar in an alkali catalyzed reaction to produce a transesterification reactor effluent stream that contains a plurality of fatty acid methyl esters and glycerin. Preferably, the methanol is added to the transesterification reactor at a rate equal to about 200 percent of the stoichiometric amount of methanol required for the catalyzed reaction and the potassium hydroxide is added to the transesterification reactor at a rate of about 0.5 percent by weight to 2.0 percent by weight of glycerides present in the glycerolysis effluent stream. More preferably, the potassium hydroxide is dissolved in the methanol prior to their introduction to the transesterification reactor. Preferably, the transesterification reactor comprises at least two continuous stirred tank reactors that are operated in series, said reactors having a combined residence time of not more than about 90 minutes.

The effluent from transesterification reaction step 42 is preferably introduced to second separation operation 52 in which a light phase (specific gravity 0.69-0.74) is separated from a heavy phase (specific gravity 0.90-0.97). In biodiesel purification step (operation) 58, excess methanol and high-boiling impurities are preferably separated from fatty acid methyl esters in the light phase and methanol is collected for reuse. Preferably, separating the fatty acid methyl esters from the glycerin involves using the density difference between the first light liquid phase and the second heavy liquid phase to separate them. In biodiesel purification step 56, differences in component vapor pressures are used to separate excess methanol and high-boiling impurities from fatty acid methyl esters in the light phase, and methanol is collected for reuse.

In a preferred embodiment, second separation step 52 comprises: separating the fatty acid methyl esters from the glycerin in the transesterification effluent stream in a continuous clarifier in phase separation step 54. Preferably, in the continuous clarifier, a first light liquid phase in which the plurality of fatty acid methyl esters are concentrated and a second heavy liquid phase in which glycerin is concentrated are continuously separated at a temperature of about 25° C. to about 65° C. to produce a fatty acid methyl ester rich stream and a glycerin rich stream.

In preferred embodiments, the light phase is separated in fatty acid methyl esters purification step 56. In step 56, differences in component vapor pressures are used to separate excess methanol and high-boiling impurities from fatty acid methyl esters in the light phase, and methanol is collected for reuse. Preferably, purifying the fatty acid methyl ester rich stream step 58 further comprises: using a distillation column to separate the fatty acid methyl ester rich stream into a bottoms fraction, an overhead fraction comprising primarily methanol, and a side stream fraction comprising a fatty acid methyl ester product. Preferably, the bottoms fraction produced by the distillation column comprises impurities, unsaponafiable materials, unreacted monoglycerides, unreacted diglycerides, unreacted triglycerides and free fatty acids. Preferably, the fatty acid methyl ester product produced by the distillation column meets ASTM specification D 6751-02. Preferably, the overhead fraction produced by the distillation column comprises essentially methanol. Preferably, the distillation column is operated at a pressure below about 2 pounds per square inch absolute and at a temperature in the range of about 180° C. to about 280° C. More preferably, the distillation column is operated at a pressure in the range of about 0.1 pounds per square inch absolute to about 1 pound per square inch absolute and at a temperature in the range of about 180° C. to about 230° C. Preferably, the distillation column contains packing material that is operative to achieve high efficiency vacuum distillation. More preferably, the distillation column is packed with a structured packing.

In preferred embodiments, the heavy phase from second separation step 52 is treated in catalyst separation step 62 comprising mineral acid addition step 64, catalyst precipitation step 66 in which the alkali catalyst is reacted with a mineral acid to produce a solid precipitate, catalyst precipitation reactor effluent filtration step 70 in which methanol washing step 68 occurs before the alkali salt precipitate is removed in salt recovery step 71, permeate separation step 72 in which the precipitate-free permeate is separated into two liquid phases, with the fatty acids and fatty acid methyl esters floating to the top and the glycerin and most of the methanol sinking to the bottom, pH neutralization step 74 in which the pH of the glycerin is increased, and free fatty acid recycling step 76.

In preferred embodiments, crude glycerin is treated in glycerin purification step 80 which comprises glycerin purification by differences in component vapor pressures. A preferred embodiment comprises distillation or fractionation step 84 in which methanol and high boiling impurities are separated from the glycerin. Glycerin decolorization step (operation) 86 comprises using a packed bed of activated carbon to remove color from the distilled glycerin.

Preferably, in purifying the glycerin rich stream and recovering methanol from it to produce the purified glycerin product and a wet methanol stream, the potassium hydroxide in the glycerin rich stream is reacted with phosphoric acid or sulfuric acid to produce an insoluble salt having fertilizer value that is removed from the glycerin rich stream in a solids separation operation and thereafter filtered and rinsed with methanol, the pH of the glycerin rich stream being adjusted to about neutral by adding a caustic alkali solution and then further purified in a glycerin distillation column that is operated at a temperature in the range of about 180° C. to about 230° C. and at a pressure in the range of about 0.1 pounds per square inch absolute to about 1 pounds per square inch absolute and in a decolorization column comprising a packed bed of activated carbon operated at a temperature in the range of about 40° C. to about 200° C.

Preferably, the wet methanol is treated in methanol purification step 88 in which water is removed from the wet methanol. More preferably, the water is removed by vapor pressure differences or adsorption. In a preferred embodiment, the methanol is purified by distillation or fractionation in methanol distillation or fractionation step 90. In preferred embodiments, purifying the wet methanol stream comprises removing water from it to produce a purified methanol product. Preferably, the wet methanol stream is purified in a methanol distillation column that is operated at a temperature in the range of about 60° C. to about 110° C. and at a pressure in the range of about 14 pounds per square inch absolute to about 20 pounds per square inch absolute.

In glycerin recycling step 92, glycerin is preferably recycled to step 28 and in methanol recycling step 94, methanol is preferably recycled to step 44. Preferably, glycerin recycling step 92 involves recycling at least a portion of the purified glycerin product into the glycerolysis reactor for reaction with the plurality of free fatty acids in the feedstock. Preferably, the methanol recycling step involves recycling at least a portion of the purified methanol product into the transesterification reactor for reaction with the plurality of glycerides. The additional methanol required for the transesterification reaction is supplied to the methoxide tank. Biodiesel is delivered to its market in biodiesel delivery step 96 and glycerin is delivered to its market in glycerin delivery step 98.

Figure 2:
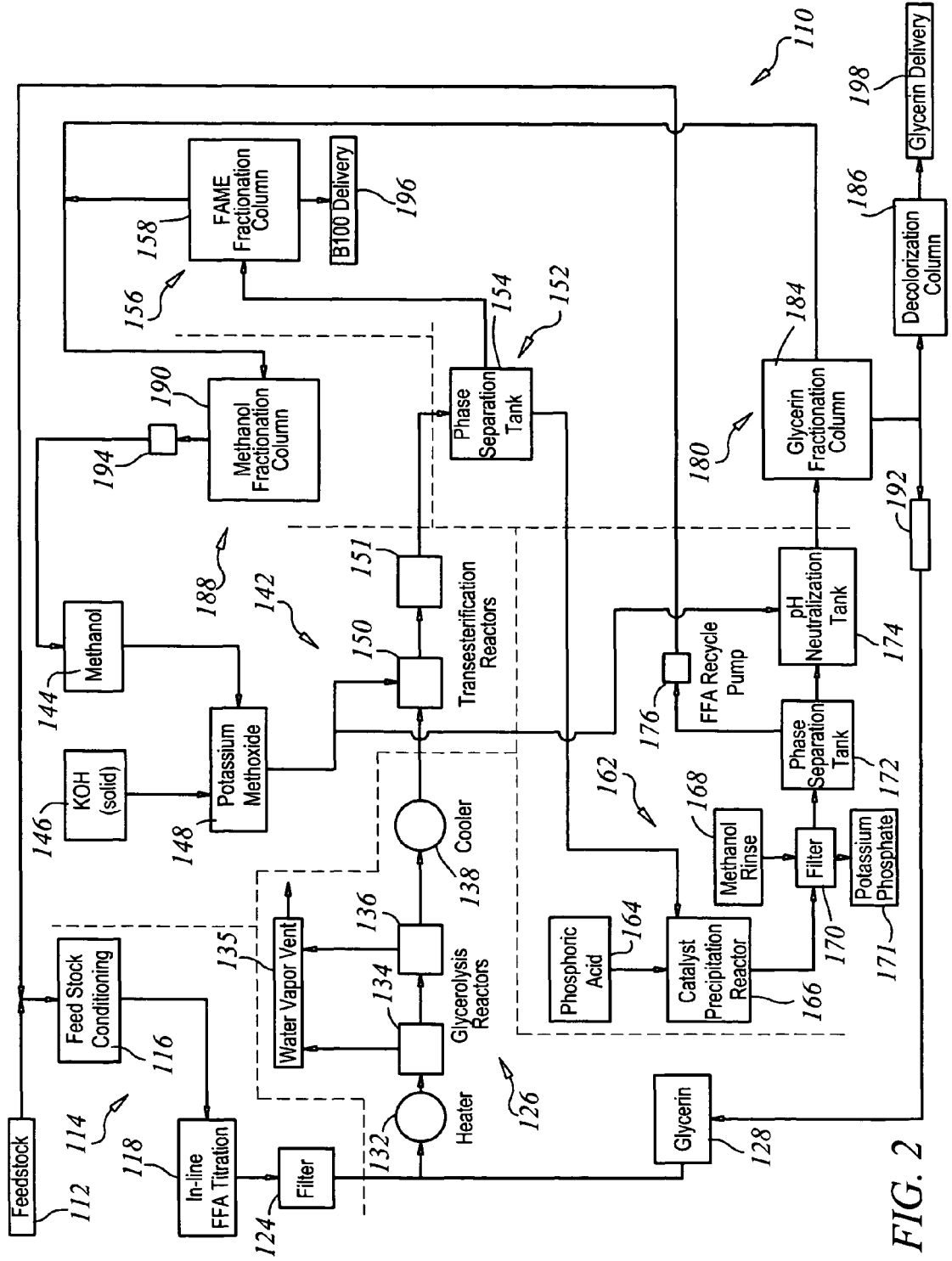
FIG. 2 is a schematic block diagram for another preferred embodiment of the invention.

Referring to FIG. 2, a preferred embodiment of system 110 for the conversion of high free fatty acid feedstocks into biodiesel is presented. Biodiesel production system 110 preferably comprises the subsystems and reactors described below.

In feedstock introduction subsystem 112, the feedstock is introduced to system 110. In a preferred embodiment, a feed material is composed of between 0 and 100 percent free fatty acid content, with the remainder comprising mono-, di- and tri-glycerides, moisture, impurities and unsaponafiables (MIU).

In preferred embodiments, the introduced feedstock is conditioned in feedstock conditioning subsystem 114 comprising feedstock heating and mixing vessel 116 in which the high free fatty acid feedstock is heated and mixed to ensure a uniform, heterogeneous mixture with uniform viscosity, free fatty acid inline titration device 118 in which the concentration of free fatty acids in the feedstock is measured, and filter 124 in which solid insoluble substances are removed. Preferably, the feed material is heated in feedstock heating and mixing vessel 116 to ensure that all of the available lipids are liquid and solids are suspended. The applicants have found that temperatures in the range of at least 35 degrees (°) Centigrade (C) but not more than 200° C., are adequate to melt the lipids, decrease their viscosity and allow thorough mixing of the feedstock. The methods employed to provide agitation and increase temperature are considered to be obvious to those skilled in the art, but the preferred embodiment of this invention uses a jacketed stirred tank.

The concentration of free fatty acid in the conditioned feedstock is then measured in on-line free fatty acid titration device 118. The concentration is measured continuously to allow continuous control of downstream process steps.

The heated mixture is then filtered in feedstock filter 124 to remove substantially all insoluble solids greater than 100 microns in size that could damage downstream processing units. There are many types of commercially-available solids separation equipment capable of performing this separation and their substitution would have been obvious to those skilled in the art. In a preferred embodiment, a rotary screen is used.

In preferred embodiments, the conditioned feedstock is introduced to glycerolysis reaction subsystem 126 which comprises glycerin addition apparatus 128, input heater 132, first glycerolysis reactor 134 and second glycerolysis reactor 136 and glycerolysis effluent cooler 138. The filtered product of step 24 is combined with glycerin and subjected to conditions that promote the glycerolysis reaction in glycerolysis reaction subsystem 126. In preferred embodiments, these conditions are a temperature between about 150° C. and about 250° C. and a pressure between about 0.1 pounds per square inch, absolute (psia) and about 30 psia. A more preferred condition is a temperature of about 220° C. and a pressure of about 2 psia. Glycerin is added to the filtered grease feedstock in excess of the free fatty acid molar quantity of the grease feedstock. This excess is in the range of 10 percent to 300 percent excess glycerin (from 110 percent to 400 percent of the stoichiometric amount). In this embodiment, the glycerolysis reactors used as elements 134 and 136 are configured as two heated, continuous stirred tank reactors (CSTR's) in series. In these vessels, the mixture of glycerin and grease (containing free fatty acids) is agitated to keep the two immiscible fluids in intimate contact. In a preferred embodiment, mixing is provided by an agitator with a power input per unit volume of about 20 W/gal to about 25 W/gal to achieve intense micromixing and high free fatty acid conversion rates. Under these conditions, the free fatty acids are converted into glycerides (mono-, di-, or tri-glycerides) with the production of water. The water is vented as vapor and removed from the system together with any water that was initially present in the feedstock in water vapor vent 135. The free fatty acid content of the reactor effluent stream in this preferred embodiment of the invention can consistently be maintained at less than 0.5 percent w/w. Because of the corrosive nature of free fatty acids, the glycerolysis reactor is preferably constructed of materials resistant to organic acids. Suitable materials include stainless steel, Teflon® fluorocarbon, glass or coated carbon steel.

The effluent from glycerolysis reaction subsystem 126 contains mono-, di-, and tri-glycerides and residual fatty acids. The glycerolysis reaction effluent is introduced to alkali catalyzed transesterification subsystem 142 which preferably comprises methanol metering apparatus 144, potassium hydroxide metering apparatus 146, methoxide addition apparatus 148 and first transesterification reactor 150 and second transesterification reactor 151 in which the glycerides undergo transesterification.

In transesterification reaction subsystem 142, the glycerides are transesterified with an alkali catalyst and a simple alcohol having 1 to 5 carbons. In a preferred embodiment, the alkali catalyst is potassium hydroxide and the alcohol is methanol. The residual FFAs are saponified consuming a molar quantity of alkali catalyst equal to the number of moles of FFA present.

The transesterification (TE) reaction is preferably catalyzed by potassium methoxide, which is formed from the addition of potassium hydroxide to methanol. The amount of potassium hydroxide added is preferably equivalent to 0.5 percent to 2.0 percent w/w of the glycerides present in the feed solution. The methanol and catalyst are combined and added to the solution of glycerides coming from the glycerolysis reactors by methoxide addition apparatus 148. A two times (200 percent) stoichiometric excess of methanol based upon the molar concentration of fatty acids tied up as glycerides is added to the reaction mixture. Upon entering each transesterification reactor 150 and 151, the two-phase system undergoes vigorous mixing. Preferably, the reaction temperature is held between about 25° C. and about 65° C. At this temperature, the miscibility of the phases is limited and mixing is required to achieve a high conversion rate. The residence time required is dependent on glyceride composition of the feed (between mono-, di- and tri-glycerides), temperature, catalyst concentration and mass transfer rate. Thus, agitation intensity is preferably considered in selecting a residence time. Typically, the residence time required for greater than (>) 99 percent conversion of tri-glycerides to methyl esters is 20 to 30 minutes. In the transesterification reactor, the presence of potassium hydroxide, methanol, and fatty acid esters can be corrosive. In a preferred embodiment, at least two CSTRs in series are used. Suitable resistant materials are preferably chosen for the reactors.

In preferred embodiments, the effluent from transesterification subsystem 142 is introduced to phase separation subsystem 152 which comprise phase separation tank 154 in which a light phase (specific gravity 0.69-0.74) is separated from a heavy phase (specific gravity 0.90-0.97). The effluent streams from the phase separator are a light phase (FAMEs) comprised of methanol and methyl esters (biodiesel), a fraction of the excess alcohol and some impurities, and a heavy phase (crude glycerin) containing glycerin, alcohol, FAMEs, soaps, alkali catalyst, a trace of water and some impurities. Phase separation unit 154 is preferably a conventional liquid/liquid separator, capable of separating the heavy phase from the light phase. Selection of a specific type of liquid/liquid separator would be obvious to one skilled in the art. In a preferred embodiment, continuous clarifier 154 is used.

Preferably, in biodiesel purification subsystem 156, excess methanol and high-boiling impurities are separated from fatty acid methyl esters in the light phase in FAME fractionation column 158 and methanol is collected for reuse. Preferably, purifying the fatty acid methyl ester rich stream subsystem 156 further comprises: FAME distillation column 158 for separating the fatty acid methyl ester rich stream into a bottoms fraction, an overhead fraction comprising primarily methanol, and a side stream fraction comprising a fatty acid methyl ester product. Preferably, the bottoms fraction produced by FAME distillation column 158 comprises impurities, and unsaponafiable materials, unreacted monoglycerides, unreacted diglycerides, unreacted triglycerides and fatty acids. Preferably, the fatty acid methyl ester product produced by FAME distillation column 158 meets ASTM specification D 6751-02. Preferably, the overhead fraction produced by FAME distillation column 158 comprises essentially methanol. Preferably, FAME distillation column 158 is operated under pressure below about 2 pounds per square inch absolute and at a temperature in the range of about 180° C. to about 280° C. More preferably, FAME distillation column 158 is operated under pressure in the range of about 0.1 pounds per square inch absolute to about 2 pounds per square inch absolute and at a temperature in the range of about 180° C. to about 230° C. Preferably, FAME distillation column 158 contains high efficiency structured packing material.

The heavy phase separated in phase separation tank 154 is preferably treated in catalyst separation subsystem 162 comprising phosphoric acid addition apparatus 164, catalyst precipitation reactor 166, catalyst precipitation reactor effluent filter 170 in which washing with methanol 168 occurs before the potassium phosphate precipitate 171 is removed from the filter, permeate separation tank 172, pH neutralization tank and free fatty acid recycling apparatus 176.

In preferred embodiments, in catalyst separation subsystem 162, the crude glycerin phase is pumped to a catalyst precipitation reactor where a mineral acid 164 is added. Preferably, the amount of acid added is a molar quantity equal to the molar quantity of alkali catalyst used in the transesterification reaction. The product of the reaction is an insoluble salt that can be separated as a solid. In addition to forming an insoluble salt, the acid converts soaps formed in transesterification reaction subsystem 142 to free fatty acids. In a preferred embodiment, potassium hydroxide is used as the transesterification catalyst, and the precipitation reaction uses phosphoric acid to form monobasic potassium phosphate. This salt is not soluble in this system and can be removed by simple filtration. As the potassium phosphate salt is filtered in catalyst precipitation reactor effluent filter 170, methanol 168 is used to wash glycerin and other process chemicals off of the precipitate.

The permeate from catalyst precipitation reactor effluent filter 170 is sent to another phase separation operation where two liquid phases form and separate according to their relative specific gravities in permeate separation tank 172. Glycerin, water, impurities and most of the methanol report to the bottom or heavy phase, while FAME, some methanol and fatty acids report to the top, or light phase. The light phase is combined with the light phase from the previous phase separation subsystem (subsystem 152) and sent to the FAME fractionation column 158. The heavy phase is sent to a reaction operation where any residual acid is neutralized in pH neutralization reactor 174 by adding a small amount of caustic. In a preferred embodiment, this is performed in a CSTR.

Following pH neutralization reactor 174, the crude glycerin phase is sent to the glycerin refining subsystem 180, where the methanol and water are separated and collected for reuse and the glycerin is separated from the high boiling impurities. In a preferred embodiment, glycerin separation is performed in glycerin distillation or fractionation column 184 with a glycerin side draw. In preferred embodiments, the distilled glycerin is treated in glycerin decolorization column 186 in which activated carbon is used to remove color from the distilled glycerin.

The methanol recovered from the distillation column contains trace amounts of water and is therefore considered a "wet" methanol stream that must be purified prior to reuse in the process in methanol purification subsystem 188. This "wet" methanol stream is collected and purified by distillation in methanol purification column 190 before being pumped back into the inventory storage tanks.

The distilled glycerin stream is then subjected to decolorization through activated carbon bed 186. The feed enters the column from the bottom and is allowed to flow upwards through the activated carbon bed resulting in a colorless, solventless and salt free glycerin that is >95 percent pure.

In preferred embodiments, glycerin recycling pump 192 is used to recycle glycerin to glycerin addition apparatus 128. Methanol recycling apparatus 194 is preferably used to recycle methanol to methanol metering apparatus 144. Biodiesel is delivered to its market in biodiesel delivery vehicle 196 and glycerin is delivered to its market in glycerin delivery vehicle 198.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

WORKING EXAMPLE NO. 1

Rendered yellow grease with a free fatty acid concentration of 20 percent by weight and 2 percent moisture, impurities and unsaponafiable (MIU) was fed to a preferred embodiment of the invention at 100 pounds per minute (lbs/min). The grease was filtered and titrated intermittently as it was fed to the glycerolysis reactors. Glycerin was added at a rate of 13 lbs/min. The temperature of the grease and glycerin mixture was raised to 210° C. as it was fed into the first of the glycerolysis CSTRs. In the reactor, the pressure was reduced to 2 psia and the temperature was maintained at 210° C. The vessel is fitted with a high intensity agitator to keep the immiscible liquids in contact. Water vapor produced by the reaction was removed through vents in the reactor headspace. The residence time in each of the glycerolysis reactors was 2.5 hours. The conversion of fatty acids to glycerides in the first vessel was 85 percent. The fatty acid concentration leaving the second reactor was maintained at 0.5 percent w/w.

The product from the glycerolysis reactors was cooled to 50° C. and fed continuously to the transesterification reactors in which a solution of potassium hydroxide in methanol was added. The potassium hydroxide was added at a rate of 1.1 lbs/min and mixed with 22 lbs/min of methanol. The transesterification took place in two CSTRs in series, each with a two-hour residence time.

The transesterified product was then fed to a phase separation tank where the majority of the FAMEs and a small concentration of the unreacted methanol floated to the top. The glycerin, the majority of the unreacted methanol, some FAMEs, potassium hydroxide and soaps sank to the bottom.

The bottom, or heavy phase was sent to an acidification reactor where the potassium hydroxide catalyst added in the transesterification step was reacted with 1.96 lbs/min phosphoric acid. The soaps converted back to free fatty acids and the potassium hydroxide was neutralized. The product of this acidification was monobasic potassium phosphate, which was not soluble in this system.

The monobasic potassium phosphate precipitate was filtered out and the permeate was fed to a second phase separation tank where the FAMEs and free fatty acids present in the permeate floated to the top and the glycerin and methanol sank to the bottom. The top, or light, phase was mixed with the light phase from the first phase separation tank and fed to the FAME fractionation column. The pH of the heavy phase was adjusted back to 7.5 with potassium hydroxide and fed to the glycerin fractionation column.

The glycerin fractionation column recovered 10 lbs/min of methanol and 18 lbs/min of glycerin. The glycerin produced was more than 95 percent pure with non-detectable concentrations of salts and methanol. This glycerin stream was split into two streams: 13 lbs/min was recycled back to the glycerin feed tank for the glycerolysis reaction and 5 lbs/min was pumped through the decolorization column and collected for market.

The two light phase streams were fed to the FAME fractionation column where 2 lbs/min of methanol was recovered and 92 lbs/min of FAMEs meeting ASTM D 6751-02 (Standard Specification for Biodiesel Fuel (B100) Blend Stock for Distillate Fuels) were produced.

WORKING EXAMPLE NO. 2

Fancy bleachable inedible tallow with a free fatty acid concentration of 4 percent by weight and 0.5 percent MIU (moisture, impurities and unsaponafiable) was fed to a preferred embodiment of the invention at 100 lbs/min. The grease was filtered and titrated continuously as it was fed to the glycerolysis reactors. Glycerin was added at a rate of 2.6 lbs/min. The temperature of the grease and glycerin mixture was raised to 210° C. as it was fed into the first of the glycerolysis CSTRs. In the reactor the pressure was reduced to 2 psia and the temperature was maintained. The vessel was fitted with an agitator to keep the immiscible liquids in contact. Water vapor produced by the reaction was removed through vents in the reactor headspace. The residence time in each of the glycerolysis reactors was 2.5 hours. The conversion of fatty acids to glycerides in the first vessel was 92 percent. The fatty acid concentration leaving the second reactor was maintained at 0.5 percent by weight.

The product from the glycerolysis reactors was cooled to 50° C. and fed to the transesterification reactors in which a solution of potassium hydroxide in methanol was added. The potassium hydroxide was added at a rate of 1.0 lbs/min and mixed with 22 lbs/min of methanol. The transesterification took place in two CSTRs in series, each with a two-hour residence time.

The transesterified product was then fed to a phase separation tank where the majority of the FAMEs and a small concentration of the unreacted methanol floated to the top. The glycerin, the majority of the unreacted methanol, some FAMEs, potassium hydroxide and soaps sank to the bottom.

The bottom, or heavy phase was sent to an acidification reactor where the potassium hydroxide catalyst added in the transesterification operation was reacted with 1.79 lbs/min phosphoric acid. The soaps converted back to free fatty acids and the potassium hydroxide was neutralized. The product of this acidification was monobasic potassium phosphate, which was not soluble in this system.

The monobasic potassium phosphate precipitate was filtered out and the permeate was fed to a second phase separation tank where the FAMEs and free fatty acids floated to the top and the glycerin and methanol sank to the bottom. The top, or light, phase was mixed with the light phase from the first phase separation tank and fed to the FAME fractionation column. The pH of the heavy phase was adjusted back to 7.8 with 0.1 lbs/min potassium hydroxide and fed to the glycerin fractionation column.

The glycerin fractionation column recovered 10 lbs/min of methanol and 10.2 lbs/min of glycerin. The glycerin produced was more than 95 percent pure with non-detectable concentrations of salts and methanol. The glycerin stream was split into two streams: 2.6 lbs/min was recycled back to the glycerin feed tank for the glycerolysis reaction and 7.6 lbs/min was collected for market.

The two light phase streams were fed to the FAME fractionation column in which 2.1 lbs/min of methanol was recovered and 93 lbs/min of FAMEs meeting ASTM D 6751-02 (Standard Specification for Biodiesel Fuel (B100) Blend Stock for Distillate Fuels) was produced.

WORKING EXAMPLE NO. 3

Degummed food grade soybean oil with a free fatty acid concentration of 0.5 percent by weight and 0.5 percent MIU (moisture, impurities and unsaponafiable) was fed to a preferred embodiment of the invention at 100 lbs/min. The grease was filtered and titrated continuously as it was transferred from the feedstock conditioner. Due to the low concentration of free fatty acids, the glycerolysis section of the process was bypassed when using this feedstock.

The fatty acid concentration entering the transesterification reactors was 0.5 percent by weight. The potassium hydroxide was added at a rate of 1.0 lbs/min and mixed with 22 lbs/min of methanol. The transesterification took place in two CSTRs in series, each with a two-hour residence time.

The transesterified product was then fed to a phase separation tank where the majority of the FAMEs and a small concentration of the unreacted methanol floated to the top. The glycerin, the majority of the unreacted methanol, some FAMEs, potassium hydroxide and soaps sank to the bottom.

The bottom, or heavy, phase was sent to an acidification reactor where the potassium hydroxide catalyst added in the transesterification operation was reacted with 1.76 lbs/min phosphoric acid. The pH of the solution was decreased, and the product of this acidification was monobasic potassium phosphate, which was not soluble in this system.

The precipitate was filtered out at 2.2 lbs/min and the filter permeate was fed to a phase separation tank in which the FAMEs and free fatty acids floated to the top and the glycerin and methanol sank to the bottom. The top, or light, phase was mixed with the light phase from the first phase separation tank and fed to the FAME fractionation column. The heavy phase was transferred to another tank and the pH was adjusted back to 7.4 with 0.1 lbs/min potassium hydroxide. Then, the glycerin/methanol mixture was fed to the glycerin fractionation column.

The glycerin fractionation column recovered 10 lbs/min of methanol and 8.5 lbs/min of glycerin. The glycerin produced had a purity greater than 95 percent with non-detectable concentrations of salts and methanol. The glycerin was collected for market.

The two light phase streams were fed to the FAME fractionation column where 2.1 lbs/min of methanol was recovered and 93 lbs/min of FAMEs meeting ASTM D 6751-02 (Standard Specification for Biodiesel Fuel (B100) Blend Stock for Distillate Fuels) were produced.

WORKING EXAMPLE NO. 4

Rendered trap grease with a free fatty acid concentration of 68 percent by weight and 5% MIU (moisture, impurities and unsaponafiable) was fed to the invention at 100 lbs/min. The grease was filtered and titrated continuously as it was fed to the glycerolysis reactors. Glycerin was added at a rate of 44 lbs/min. The temperature of the grease and glycerin mixture was raised to 210° C. as it was fed into the first of the glycerolysis CSTRs. In the reactor, the pressure was reduced to 2 psia and the temperature was maintained. The vessel was fitted with a low frequency acoustic transducer operating at a frequency of about 30-80 Hz and a displacement of about 0.2 inch to about 1.0 inch to achieve intense micromixing and to keep the immiscible liquids in contact. Water vapor produced by the reaction was removed through vents in the reactor headspace. The residence time in each of the glycerolysis reactors was 3.5 hours. The conversion of fatty acids to glycerides in the first vessel was 87 percent. The fatty acid concentration leaving the second reactor was maintained at 0.5 percent by weight.

The product from the glycerolysis reactors was cooled to 50° C. and fed to the transesterification reactors where a solution of potassium hydroxide in methanol was added. The potassium hydroxide was added at a rate of 1.4 lbs/min and mixed with 21 lbs/min of methanol. The transesterification took place in two CSTRs in series, each with a two-hour residence time.

The transesterified product was then fed to a phase separation tank where the majority of the FAMEs and 10 percent of the unreacted methanol floated to the top and the glycerin, the majority of the unreacted methanol, some FAMEs, potassium hydroxide and soaps sank to the bottom.

The bottom, or heavy, phase was sent to an acidification reactor where the potassium hydroxide catalyst added in the transesterification operation was reacted with 2.45 lbs/min phosphoric acid. The soaps converted back to free fatty acids and the potassium hydroxide was neutralized. The product of this acidification was monobasic potassium phosphate, which was not soluble in this system.

The monobasic potassium phosphate precipitate was filtered out at 3.1 lbs/min and the permeate was fed to a second phase separation tank where the FAMEs and free fatty acids floated to the top and the glycerin and methanol sank to the bottom. The top, or light, phase was mixed with the light phase from the first phase separation tank and fed to the FAME fractionation column. The pH of the heavy phase was adjusted back to 7.3 with 0.14 lbs/min potassium hydroxide and fed to the glycerin fractionation column.

The glycerin fractionation column recovered 10 lbs/min of methanol and 40 lbs/min of glycerin. The glycerin produced had a purity greater than 95 percent with non-detectable concentrations of salts and methanol. This glycerin stream was recycled back to the glycerin feed tank for the glycerolysis reaction and an additional 4 lbs/min of fresh glycerin was added to the glycerin feed tank to provide enough glycerin feed for the glycerolysis reaction.

The two light phase streams were fed to the FAME fractionation column where 2.1 lbs/min of methanol was recovered and 91 lbs/min of FAMEs meeting ASTM D 6751-02 (Standard Specification for Biodiesel Fuel (B100) Blend Stock for Distillate Fuels) were produced.

WORKING EXAMPLE NO. 5

Rendered brown grease with a free fatty acid concentration of 37 percent by weight and 5 percent MIU (moisture, impurities and unsaponafiable) was fed to the invention at 100 lbs/min. The grease was filtered and titrated continuously as it was fed to the glycerolysis reactors. Glycerin was added at a rate of 24 lbs/min. The temperature of the grease and glycerin mixture was raised to 210° C. as it was fed into the first of the glycerolysis CSTRs. In the reactor, the pressure was reduced to 2 psia and the temperature was maintained. The vessel is fitted with an agitator to keep the immiscible liquids in contact. Water vapor produced by the reaction was removed through vents in the reactor headspace. The residence time in each of the glycerolysis reactors was 3.0 hours. The conversion of fatty acids to glycerides in the first vessel was 90 percent. The fatty acid concentration leaving the second reactor was maintained at 0.5 percent by weight.

The product from the glycerolysis reactors was cooled to 50° C. and fed to the transesterification reactors where a solution of potassium hydroxide in methanol was added. The potassium hydroxide was added at a rate of 1.2 lbs/min and mixed with 21 lbs/min of methanol. The transesterification took place in two CSTRs in series, each with a two-hour residence time.

The transesterified product was then fed to a phase separation tank where the majority of the FAMEs and 10 percent of the unreacted methanol floated to the top. The glycerin, the majority of the unreacted methanol, some FAMEs, potassium hydroxide and soaps sank to the bottom.

The bottom, or heavy, phase was sent to an acidification reactor where the potassium hydroxide catalyst added in the transesterification was reacted with 2.13 lbs/min phosphoric acid. The soaps converted back to free fatty acids and the potassium hydroxide was neutralized. The product of this acidification was monobasic potassium phosphate, which is not soluble in this system.

The monobasic potassium phosphate precipitate was filtered out at 2.7 lbs/min and the filter permeate was fed to a second phase separation tank where the FAMEs and free fatty acids floated to the top and the glycerin and methanol sank to the bottom. The top, or light, phase was mixed with the light phase from the first phase separation tank and fed to the FAME fractionation column. The pH of the heavy phase was adjusted back to 7.5 with 0.12 lbs/min potassium hydroxide and fed to the glycerin fractionation column.

The glycerin fractionation column recovered 10 lbs/min of methanol and 25.2 lbs/min of glycerin. The glycerin produced had a purity greater than 95 percent with non-detectable concentrations of salts and methanol. This glycerin stream was split into two streams: 24 lbs/min was recycled back to the glycerin feed tank for the glycerolysis reaction and 1.2 lbs/min was collected for market.

The two light phase streams were fed to the FAME fractionation column where 2.0 lbs/min of methanol was recovered and 89.8 lbs/min of FAMEs meeting ASTM D 6751-02 (Standard Specification for Biodiesel Fuel (B100) Blend Stock for Distillate Fuels) were produced.

Many variations of the invention will occur to those skilled in the art. Some variations include using other background art reactor configurations to perform the process steps. Other variations call for using other background art operating conditions to perform the process steps. Other variations call for inserting additional unit operations, for example, separation of the glycerin product from a partially completed transesterification reaction prior to a subsequent transesterification reaction operation. All such variations are intended to be within the scope and spirit of the invention.

Although some embodiments are shown to include certain features, the applicant(s) specifically contemplate that any step or feature disclosed herein may be used together or in combination with any other step or feature on any embodiment of the invention. It is also contemplated that any step or feature may be specifically excluded from any embodiment of an invention.

What is claimed is:

1. A process for the production of purified biodiesel from a feedstock containing at least one fatty acid, the process comprising:
   (A) converting the at least one fatty acid in the feedstock to a glyceride;
   (B) reacting the glyceride with at least one alcohol to produce a fatty acid alkyl ester wherein the reaction is conducted in a transesterification reactor and further wherein the at least one alcohol is added to the transesterification reactor at a rate that is greater than the stoichiometric amount of alcohol required for transesterification; and
   (C) separating the product of step (B) into a fatty acid alkyl ester rich stream and a glycerin rich stream; and
   (D) purifying the fatty acid alkyl ester rich stream by distillation or fractionation to produce purified biodiesel having an acid number less than or equal to 0.80 mg KOH/g and total glycerin less than or equal to 0.240% mass without subjecting the fatty acid alkyl ester rich steam to water washing.

2. The process of claim 1, wherein step (A) comprises mixing the feedstock with glycerin for a time sufficient to convert the at least one fatty acid in the feedstock to a glyceride.

3. The process of claim 2, wherein the feedstock and glycerin is mixed at an elevated temperature in the absence of a catalyst.

4. The process of claim 2, wherein the glycerin is purified.

5. The process of claim 2, wherein the at least one fatty acid in the feedstock is converted to a glyceride by adding glycerin to the feedstock while mixing and subjecting the admixture to reduced pressure.

6. The process of claim 2, wherein the at least one fatty acid in the feedstock is converted to a glyceride in a glycerolysis reactor and further wherein glycerin is continuously added at a rate greater than the stoichiometric amount of glycerin required for glycerolysis.

7. The process of claim 6, wherein in step (A) glycerin is continuously added to the glycerolysis reactor at a rate in the range of about 110 percent to about 400 percent of the stoichiometric amount of glycerin required for glycerolysis.

8. The process of claim 1, wherein step (B) comprises reacting the glyceride with the at least one alcohol in the presence of an alkali catalyst to produce glycerin and the fatty acid alkyl ester.

9. The process of claim 1, wherein prior to step (A) the feedstock is conditioned to remove solids.

10. The process of claim 1, wherein the feedstock comprises at least one fatty acid at a concentration in the range of about 3 to about 97 percent by weight.

11. The process of claim 1, wherein in step (B) the alcohol is added at a rate equal to about 200 percent of the stoichiometric amount of alcohol required for transesterification.

12. The process of claim 1, wherein the process is continuous.

13. The process of claim 1, further comprising adjusting the pH of the glycerin rich stream by adding an acid solution thereto.

14. A process for the production of purified biodiesel from a feedstock containing at least one fatty acid, the process comprising:
   (A) converting the at least one fatty acid in the feedstock to a glyceride;
   (B) reacting the glyceride with at least one alcohol to produce a fatty acid alkyl ester wherein the reaction is conducted in a transesterification reactor and further wherein the at least one alcohol is added to the transesterification reactor at a rate that is greater than the stoichiometric amount of alcohol required for transesterification; and
   (C) separating the product of step (B) into a fatty acid alkyl ester rich stream and a glycerin rich stream; and
   (D) purifying the fatty acid alkyl ester rich stream by distillation or fractionation to produce purified biodiesel having an acid number less than or equal to 0.80 mg KOH/g and total glycerin less than or equal to 0.240% mass without subjecting the fatty acid alkyl ester rich stream to water washing;
   wherein step (A) comprises mixing the feedstock with glycerin for a time sufficient to convert the at least one fatty acid in the feedstock to a glyceride; wherein the feedstock and glycerin are reacted in at least two continuous stirred tank reactors.

15. The process of claim 14, wherein the at least two reactors have a combined residence time of not more than about 500 minutes.

16. A process for the production of purified biodiesel from a feedstock containing at least one fatty acid, the process comprising:
   (A) converting the at least one fatty acid in the feedstock to a glyceride;
   (B) reacting the glyceride with at least one alcohol to produce a fatty acid alkyl ester wherein the reaction is conducted in a transesterification reactor and further wherein the at least one alcohol is added to the transesterification reactor at a rate that is greater than the stoichiometric amount of alcohol required for transesterification; and
   (C) separating the product of step (B) into a fatty acid alkyl ester rich stream and a glycerin rich stream; and
   (D) purifying the fatty acid alkyl ester rich stream by distillation or fractionation to produce purified biodiesel having an acid number less than or equal to 0.80 mg KOH/g and total glycerin less than or equal to 0.240% mass without subjecting the fatty acid alkyl ester rich stream to water washing; wherein the purified biodiesel produced in step (D) meets ASTM specification D 6751.

17. A process for the production of purified biodiesel from a feedstock containing at least one fatty acid, the process comprising:
   (A) converting the at least one fatty acid in the feedstock to a glyceride;
   (B) reacting the glyceride with at least one alcohol to produce a fatty acid alkyl ester wherein the reaction is conducted in a transesterification reactor and further wherein the at least one alcohol is added to the transesterification reactor at a rate that is greater than the stoichiometric amount of alcohol required for transesterification; and
   (C) separating the product of step (B) into a fatty acid alkyl ester rich stream and a glycerin rich stream; and
   (D) purifying the fatty acid alkyl ester rich stream by distillation or fractionation to produce purified biodiesel without subjecting the fatty acid alkyl ester rich steam to water washing.

18. The product produced by the process of claim 17.

* * * * *